(12) United States Patent
Uehara et al.

(10) Patent No.: US 12,220,644 B2
(45) Date of Patent: Feb. 11, 2025

(54) WATCHING SYSTEM, COMPUTER PROGRAM FOR WATCHING SYSTEM, AND CONTROL METHOD FOR WATCHING SYSTEM

(71) Applicant: Konami Digital Entertainment Co., Ltd., Tokyo (JP)

(72) Inventors: Kazuhiko Uehara, Tokyo (JP); Shigeru Chiba, Tokyo (JP); Junki Hirai, Tokyo (JP); Kai Inoue, Tokyo (JP); Akira Sakai, Tokyo (JP); Tsuguo Shinpo, Tokyo (JP); Toshiaki Kanahara, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 246 days.

(21) Appl. No.: 17/848,020

(22) Filed: Jun. 23, 2022

(65) Prior Publication Data
US 2022/0314130 A1    Oct. 6, 2022

Related U.S. Application Data

(63) Continuation of application No. PCT/JP2020/045329, filed on Dec. 4, 2020.

(30) Foreign Application Priority Data

Dec. 27, 2019  (JP) ................................. 2019-237984

(51) Int. Cl.
*A63F 13/00* (2014.01)
*A63F 13/792* (2014.01)
(Continued)

(52) U.S. Cl.
CPC ............ *A63F 13/86* (2014.09); *A63F 13/792* (2014.09); *A63F 13/87* (2014.09)

(58) Field of Classification Search
CPC .......... A63F 13/86; A63F 13/87; A63F 13/79; A63F 13/335; A63F 13/795
See application file for complete search history.

(56) References Cited

U.S. PATENT DOCUMENTS

| 2012/0086631 A1* | 4/2012 | Osman .................. A63F 13/525 345/156 |
| 2019/0075269 A1* | 3/2019 | Nashida ........... H04N 21/44218 |
| 2021/0205702 A1* | 7/2021 | Sanders .................. A63F 13/35 |

FOREIGN PATENT DOCUMENTS

| JP | 2014-155544 A | 8/2014 |
| JP | 2015-77291 A | 4/2015 |

(Continued)

OTHER PUBLICATIONS

Notice of Reasons for dated Aug. 26, 2022 from the Japanese Patent Office in JP Application No. 2019-237991.

(Continued)

*Primary Examiner* — David L Lewis
*Assistant Examiner* — Eric M Thomas
(74) *Attorney, Agent, or Firm* — Sughrue Mion, PLLC

(57) ABSTRACT

A watching system by which a game video is distributed to display devices of a plurality of watching users has: a computer; the computer accepting viewer operations by the plurality of watching users; the computer evaluating a mutual relationship of input of the viewer operation by each of the plurality of watching users; and the computer controlling an operation effect corresponding to the viewer operation so as to change based on evaluation result of the mutual relationship.

11 Claims, 9 Drawing Sheets

(51) Int. Cl.
      *A63F 13/86*       (2014.01)
      *A63F 13/87*       (2014.01)

(56) References Cited

FOREIGN PATENT DOCUMENTS

| | | |
|---|---|---|
| JP | 2018-171282 A | 11/2018 |
| JP | 6511217 B1 | 4/2019 |
| JP | 2019-71957 A | 5/2019 |
| JP | 2019-71958 A | 5/2019 |
| JP | 2019-074789 A | 5/2019 |

OTHER PUBLICATIONS

Written Opinion of the International Searching Authority dated Feb. 16, 2021 in International Application No. PCT/JP2020/045329.
Office Action date Feb. 22, 2022 issued by the Japanese Patent Office in Japanese Application No. 2019-237984.
Office Action dated Feb. 17, 2022 issued by the Japanese Patent Office in Japanese Application No. 2019-237991.
Office Action dated Feb. 17, 2022 issued by the Japanese Patent Office in Japanese Application No. 2019-238010.
International Search Report dated Feb. 16, 2021 in International Application No. PCT/JP2020/045329.
Korean Office Action dated Jun. 19, 2024 in Application No. 10-2022-7023165.

\* cited by examiner

WATCHING SYSTEM, COMPUTER PROGRAM FOR WATCHING SYSTEM, AND CONTROL METHOD FOR WATCHING SYSTEM

CROSS REFERENCE TO RELATED APPLICATIONS

This application is a Continuation of International Application No. PCT/JP2020/045329 filed Dec. 4, 2020, claiming priority based on Japanese Patent Application No. 2019-237984 filed Dec. 27, 2019, the contents of each of which being herein incorporated by reference in their entireties.

BACKGROUND OF THE INVENTION

Field of the Invention

The present invention relates to a watching system that accepts a viewer operation by a watching user, a computer program for the watching system, and a control method for the watching system.

Description of the Related Art

In the game system of Patent Literature 1, a game screen generation unit for watching of a game management server transmits a generated game screen for watching to a streaming server for distributing. Then, the game screen for watching is distributed from the streaming server to a plurality of watching player terminals. Also, a watching player instruction receiving unit of the game management server receives instructions relating to a game from the watching player. Then, when the watching player instruction receiving unit receives the instruction of action by the watching player, the received instruction is transmitted to a game control unit. Afterward, the game control unit executes the instructed action and reflects it in the game.

Furthermore, in the game system of Patent Literature 1, a watching screen generation unit of a watching management server generates a watching screen displayed on a watching player terminal. Moreover, the watching player terminal acquires a minigame from the watching management server and executes the acquired minigame. Then, the watching player terminal transmits an execution result of the minigame to the watching management server, and the watching management server transmits the execution result of the minigame to the game management server. Afterward, the game management server affects the game being executed by the player of a game player terminal according to the execution result of the minigame. In the minigame, it is possible to perform a performance as if the watching player is cheering for the game player.

Furthermore, in the system for distributing a live video of Patent Literature 2, a video distributing control unit of a video distributing server accepts input of an item to a distributor of the live video by each of a plurality of viewers. Moreover, the video distributing control unit determines whether the input of the item by the viewer satisfies a predetermined combo condition. Then, the video distributing control unit generates a combo when a predetermined combo condition is satisfied. In response to the occurrence of the combo, the video distributing control unit imparts a value that brings a benefit to the distributor. Furthermore, in the system of Patent Literature 2, a viewer screen has a comment input area, a "like" button, and an item input button.

CITATION LIST

Patent Literature

PATENT LITERATURE 1: JP 2015-77291 A
PATENT LITERATURE 2: JP 6511217 B

SUMMARY OF THE INVENTION

A watching user who watches the distributed video may wish to exhibit an effect that affects the distributed video in response to the watching user's own operation. For example, when a game video is distributed, a watching user may wish to output performances such as audio of applause and an image of a cheering message at the same time as the game video in order to cheer on the player playing the game. In this case, since the watching user performs each operation, the performance corresponding to each operation is also outputted at respective timings. Therefore, it is difficult for the watching user to obtain a sense of solidarity with other watching users.

The watching system according to one aspect of the present invention is a watching system by which a game video is distributed to display devices of a plurality of watching users, the watching system comprising: operation accepting means accepting viewer operations by the plurality of watching users; evaluation means evaluating a mutual relationship of input of the viewer operation by each of the plurality of watching users; and effect control means controlling an operation effect corresponding to the viewer operation so as to change based on evaluation result of the mutual relationship.

Furthermore, the computer program for a watching system according to one aspect of the present invention is a computer program for a watching system by which a game video is distributed to display devices of a plurality of watching users and which has a computer, the computer program causing the computer to function as: operation accepting means accepting viewer operations by the plurality of watching users; evaluation means evaluating a mutual relationship of input of the viewer operation by each of the plurality of watching users; and effect control means controlling an operation effect corresponding to the viewer operation so as to change based on evaluation result of the mutual relationship.

Moreover, the control method of a watching system according to one aspect of the present invention is a control method of a watching system by which a game video is distributed to display devices of a plurality of watching users, the control method comprising: accepting viewer operations by the plurality of watching users; evaluating a mutual relationship of input of the viewer operation by each of the plurality of watching users; and controlling an operation effect corresponding to the viewer operation so as to change based on evaluation result of the mutual relationship.

As a result, it is possible to give relevance to the effects exhibited in response to the operations by the plurality of watching users. Therefore, the watching user can obtain a sense of solidarity with other watching users, and the watching user's desire to watch is improved.

DESCRIPTION OF THE EMBODIMENTS

Hereinafter, exemplary embodiments for carrying out the present invention will be described in detail with reference to the drawings. However, the dimensions, materials, shapes, and relative positions of the components described in the following embodiments can be arbitrarily set and can be changed according to the configuration of an apparatus to which the present invention is applied or according to various conditions. Furthermore, unless otherwise specified, the scope of the present invention is not limited to the embodiments specifically described below.

First Embodiment

Figure 1:
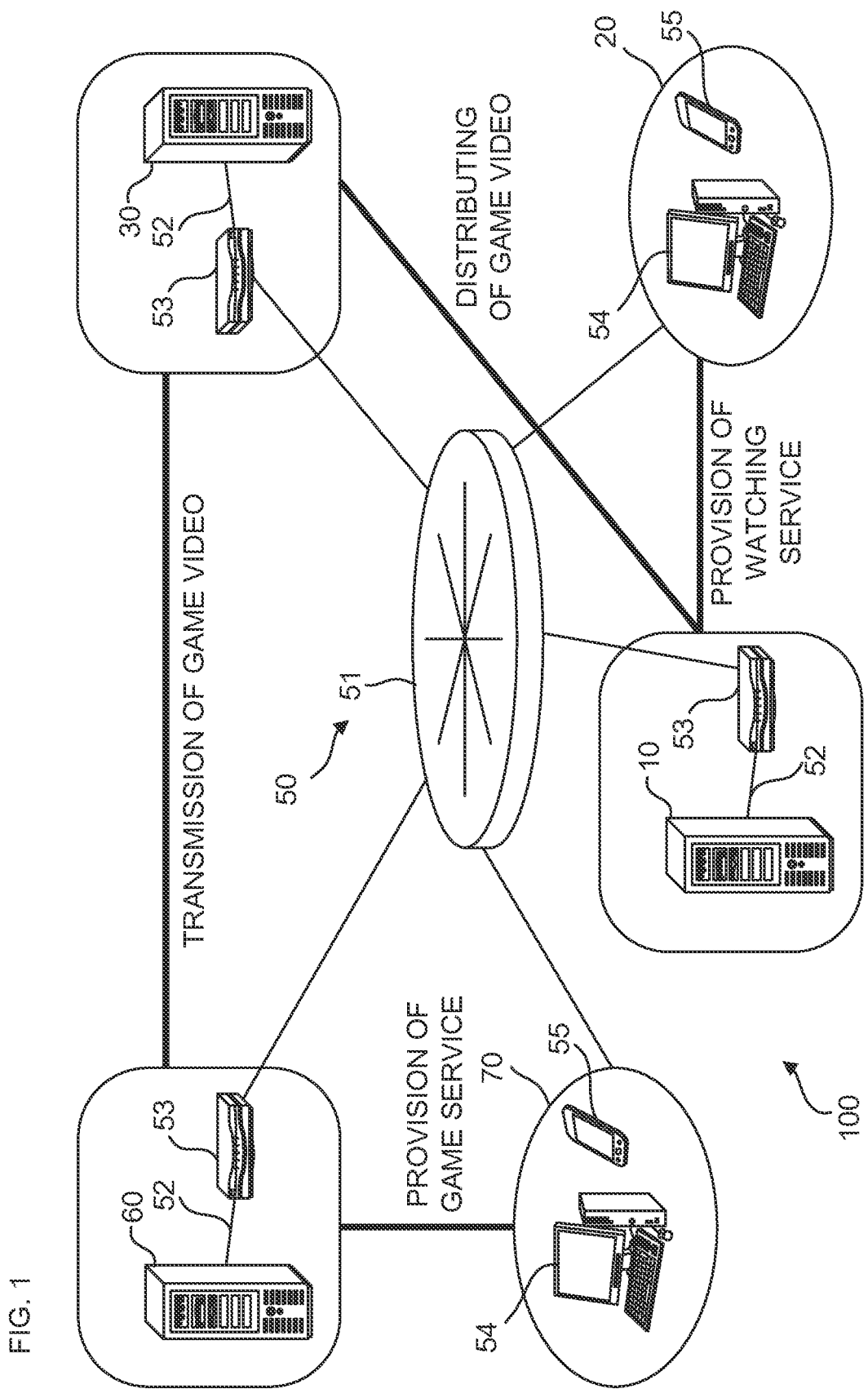
FIG. 1 shows a schematic overall diagram of the watching system.

As illustrated in FIG. 1, a watching system 100 in which a game video is distributed to display devices of a plurality of watching users has a management server 10. Furthermore, the watching system 100 has a reproduction terminal 20 for viewing a game video, a distributing server 30 for distributing the game video, a game server 60, and a game terminal 70 as one example of a game device. The reproduction terminal 20 can be connected to the management server 10 via a predetermined network 50. As one example, the watching user uses the reproduction terminal 20 at a venue of a game tournament, the user's home, or the like. Furthermore, the game terminal 70 can be connected to the game server 60 via a predetermined network 50. As one example, a user who plays a game uses the game terminal 70 at a predetermined facility such as a venue of a game tournament or a store.

The management server 10, the distributing server 30, and the game server 60 are configured as one logical server device by combining server units as a plurality of computers. However, the management server 10, the distributing server 30, and the game server 60 may be configured by a single server unit. Alternatively, the management server 10, the distributing server 30, and the game server 60 may be logically configured using cloud computing.

The management server 10 manages, with respect to the reproduction terminal 20 or the user of the reproduction terminal 20, a watching service that allows the watching user to watch the game video. The watching service includes a distributing service for distributing and updating a program or data for the reproduction terminal 20 via the network 50. Through this distributing service, the management server 10 appropriately distributes various programs or data necessary for watching the game video to each reproduction terminal 20.

For example, the management server 10 provides a web service to the user of the reproduction terminal 20 via the network 50. The web service includes a video distributing service that distributes a video reproduced through the watching service when the watching service is provided via the reproduction terminal 20. Note that the web service may include other services such as an information provision service for providing various information relating to video, a community service for providing a place for interaction such as transmission, exchange, and sharing of information by users, and a service that grants a user ID for identifying each user.

The distributing server 30 provides a service for distributing a game video to the reproduction terminal 20 or the user of the reproduction terminal 20 via the management server 10. As one example, the distributing server 30 distributes the game video generated by the game server 60 to the reproduction terminal 20 via the management server 10. The game video includes a game screen distributed by the distributing server 30 and is displayed at the same time as a watching screen managed by the management server 10. Note that the distributing server 30 may distribute a video other than the video received from the game server 60. As one example, the distributing server 30 may distribute a game video created by a user who plays a game. In this case, the distributing server 30 distributes the game video uploaded by the user to the reproduction terminal 20 via the management server 10.

The game server 60 provides various services for the game device to the game terminal 70 or the user of the game terminal 70. This service includes a distributing service for distributing and updating a program or data for the game terminal 70 via the network 50. Through this distributing service, the game server 60 appropriately distributes various programs or data necessary for providing the game service to each game terminal 70.

The game server 60 provides, as one example, a service for a sports game. For example, as a sports game, the game server 60 provides a service for a baseball game including a training part for training a baseball player and a competition part in which a team to which the trained baseball player belongs is played against an opponent team. Note that the game server 60 may provide services for other games, such as an FPS (first person shooting) game, a TPS (third person shooting) game, an RTS (real-time strategy) game, a MOBA (multiplayer online battle arena) game, and an MMORPG (massively multiplayer online role playing game), a fighting game, a racing game, a puzzle game, a trading card game, and an online strategy game. Hereinafter, a case in which the game server 60 provides a service for a baseball game will be described as an example.

Also, the service for the game device provided by the game server 60 may include a service in which the game server 60 receives user identification information of the user from the game terminal 70 and authenticates the user. Furthermore, the service for the game device may include a service in which the game server 60 receives and stores a video of the game screen or play data including the play results of the authenticated user from the game terminal 70. Moreover, the service for the game device may include a service for providing the play data stored in the game server 60 to the game terminal 70. In addition, the service for the game device may include a service in which, when a plurality of users play the same game via the network 50, the game server 60 matches the users. Furthermore, the service for the game device may include a service in which the game server 60 collects a fee from the user.

The network 50 is configured such that the game terminal 70 and the reproduction terminal 20 can be connected to the management server 10, the distributing server 30, and the game server 60, respectively. As one example, the network 50 is configured to realize network communication using TCP/IP protocol. Specifically, a LAN 52 connects each of the management server 10, the distributing server 30, and the game server 60 to the internet 51. Then, an internet 51 acting as a WAN and the LAN 52 are connected via the router 53. The reproduction terminal 20 and the game terminal 70 are also configured to be connected to the internet 51. The management server 10, the distributing server 30, the game server 60, and the reproduction terminal 20 and the game terminal 70 may be connected to each other by the internet 51 in place of or in addition to the LAN 52.

The reproduction terminal 20 and the game terminal 70 are computer devices that can be connected to a network. For example, the reproduction terminal 20 and the game terminal 70 include a stationary or foldable personal computer 54 and a mobile terminal device 55 such as a mobile phone (including smartphones). Various other computer devices such as a stationary home-use game device, a portable game device, and a portable tablet terminal device are included in the reproduction terminal 20 and the game terminal 70. By installing various computer software, the reproduction terminal 20 and the game terminal 70 can allow the user to enjoy various services provided by the management server 10 and the game server 60. Specifically, the reproduction terminal 20 functions as a game video display terminal through video reproduction software. Furthermore, the game terminal 70 functions as a game device through software for the game device. Note that the reproduction terminal 20 and the game terminal 70 may be arcade game machines.

As one example, in the watching system 100, the game server 60 provides a game service to the game terminal 70. Then, the game server 60 records a game video of the game being played using the game terminal 70, a game video created by capturing a game screen, or the like. The game video may be a video related to the game, such as a video capturing a user playing the game or an audience member watching the game. The game server 60 transmits the acquired or created game video to the distributing server 30. Then, the distributing server 30 distributes the received game video. The management server 10 combines a watching screen with the game video to be distributed by the distributing server 30 and provides this to the reproduction terminal 20.

A watching user who watches the game video can input a viewer operation using the reproduction terminal 20. Then, the management server 10 outputs an operation effect, which is an effect corresponding to the viewer operation, to the reproduction terminal 20 together with the game video. For example, when the watching user touches an operation button for displaying a cheering message, the management server 10 accepts the operation as the viewer operation. Then, the management server 10 combines a cheering message with the game video and displays this on the reproduction terminal 20. Note that at least two of the management server 10, the distributing server 30, and the game server 60 can be provided in one server. For example, the management server 10 can also function as the distributing server 30. Furthermore, the game server 60 can also function as the management server 10 and the distributing server 30.

A watching user who watches the distributed video may wish to exhibit an effect that affects the distributed video in response to the watching user's own operation. For example, when a game video is distributed, a watching user may wish to output performances such as audio of applause and an image of a cheering message at the same time as the game video in order to cheer on the player playing the game. In this case, since the watching user performs each operation, the performance corresponding to each operation is also outputted at respective timings. Therefore, it is difficult for the watching user to obtain a sense of solidarity with other watching users.

Therefore, in a first embodiment, the mutual relationship between the inputs of the viewer operations by each of the plurality of watching users is evaluated, and the operation effect changes according to the evaluation result. As a result, it is possible to give relevance to the effects exhibited in response to the operations by the plurality of watching users. Therefore, the watching user can obtain a sense of solidarity with other watching users, and the watching user's desire to watch is improved.

[Control System of Watching System]

Figure 2:
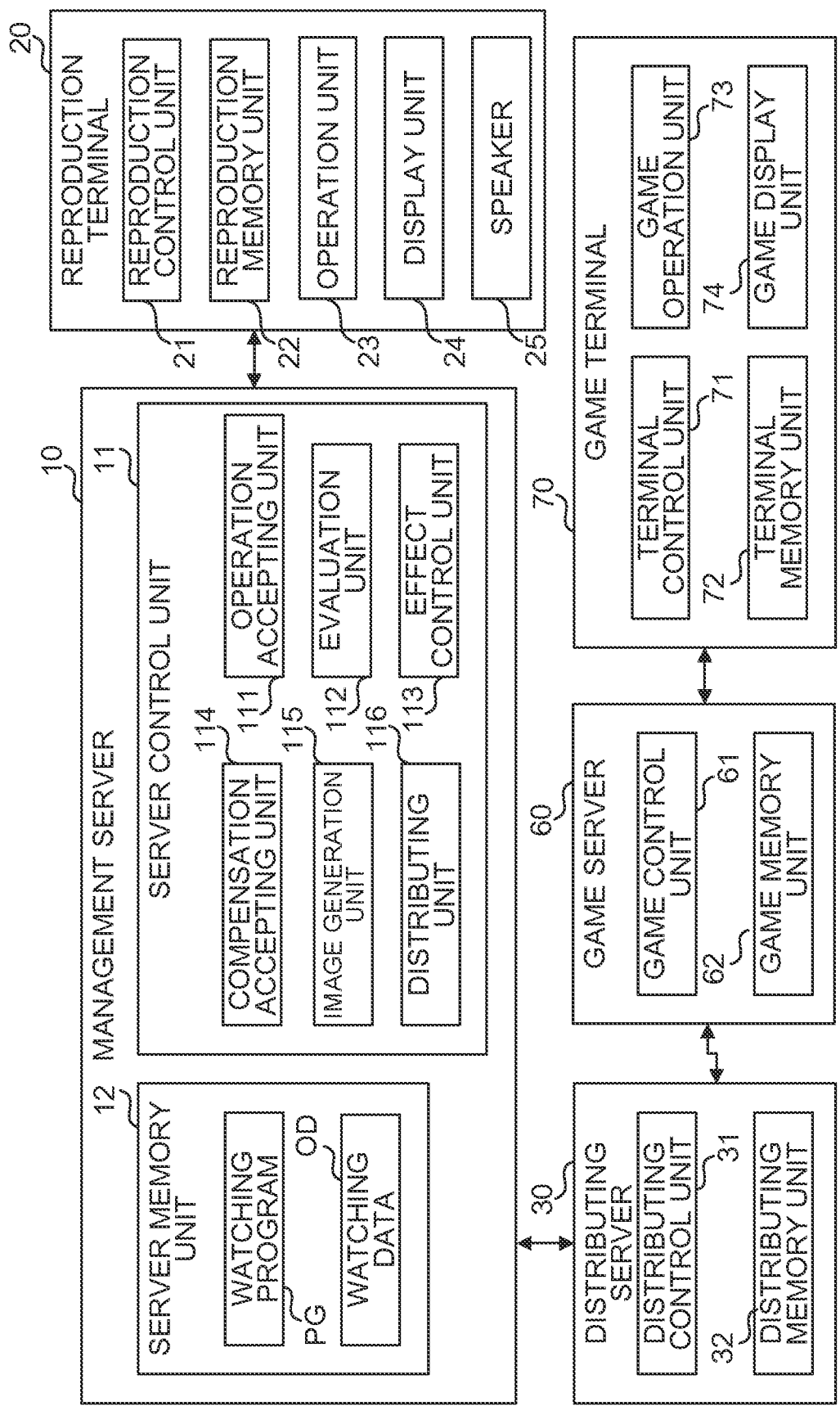
FIG. 2 shows a schematic block diagram of the watching system.

Next, a control system of the watching system 100 will be described with reference to FIG. 2. Firstly, the management server 10 includes a server control unit 11, a server memory unit 12, and an unillustrated communication unit. The server control unit 11 executes various controls for combining the watching screen with the game video received from the distributing server 30 and for transmitting this to the reproduction terminal 20. Furthermore, the server memory unit 12 stores a control program of the management server 10, a watching program PG as a computer program for providing the watching service, and a watching data OD used for creating the watching screen.

The distributing server 30 includes a distributing control unit 31, a distributing memory unit 32, and an unillustrated communication unit. The distributing control unit 31 executes various controls for distributing the game video received from the game server 60. Furthermore, the distributing memory unit 32 stores the control program of the distributing server 30 and the game video received from the game server 60. As long as a distributing format for distributing to each user simultaneously, the game video may be distributed in a real-time video distributing (live distributing) format, or in a distributing format for not distributing in a real-time, (for example, a format for distributing an edited video).

The game server 60 includes a game control unit 61, a game memory unit 62, and an unillustrated communication unit. The game control unit 61 executes various controls for providing a game service to the game terminal 70. Furthermore, the game control unit 61 records a video of the game screen, stores it in the game memory unit 62, and uploads it to the distributing server 30 as the game video. Furthermore, the game memory unit 62 stores the control program of the game server 60, user data which is information related to the user, and game data which is information related to the game. As one example, the user data includes user identification information, personal information of the user, and the like. Furthermore, the game data includes various data such as image data, BGM data, and play data of the user. The play data is data for inheriting the contents unique to each user, such as the user's play history (past achievements), to the next time onward.

The server control unit 11, the distributing control unit 31, and the game control unit 61 are configured as a computer combined from a processor for executing various arithmetic processes and operation controls according to a predetermined program, an internal memory necessary for the operation of the processor, and other peripheral devices. As one example, these processors are CPUs (central processing unit) or MPUs (micro-processing unit), control the entire device based on a predetermined program, and also comprehensively control various processes.

The server memory unit 12, the distributing memory unit 32, and the game memory unit 62 are memory devices including a non-transitory computer readable recording medium. Also, the server memory unit 12, the distributing memory unit 32, and the game memory unit 62 include RAM (random access memory), which is system work memory for the processor to operate, ROM (read-only memory) for storing the program and the system software, an HDD (hard disk drive), an SSD (solid state drive), and other memory devices. The processor can execute various processing operations such as calculation, control, and determination according to the control program stored in the ROM or the HDD. Note that the server memory unit 12, the distributing memory unit 32, and the game memory unit 62 may keep all of the data in one memory device or may store the data in a distributed manner in a plurality of memory devices.

A display device that displays an input state, a setting state, a measurement result, and various information of the device is connected to the server control unit 11, the distributing control unit 31, and the game control unit 61 by wire or wirelessly. Furthermore, an operation device including a keyboard or various switches for inputting predetermined commands and data is connected to the server memory unit 12, the distributing memory unit 32, and the game memory unit 62 by wire or wirelessly. Note that the server control unit 11, the distributing control unit 31, and the game control unit 61 can also perform control according to a program stored on a portable recording medium such as a CD (compact disc), a DVD (digital versatile disc), a CF (compact flash) card, a USB (universal serial bus) memory, or an external storage medium such as a server on the internet.

The reproduction terminal 20 includes a reproduction control unit 21, a reproduction memory unit 22, an operation unit 23 as an operation device, a display unit 24 as a display device, a speaker 25 as an audio output device, and an unillustrated communication unit. The reproduction memory unit 22 stores the control program of the reproduction terminal 20 and a reproduction program of the game video. The reproduction control unit 21 controls the reproduction terminal 20 and executes the reproduction program to display the game video on the display unit 24. Furthermore, the operation unit 23 is an operation device such as a controller or a touch panel and receives an input of a viewer operation by a watching user. Furthermore, the display unit 24 is a display device such as a television, a display, or a touch panel, and displays a game video to be viewed by the user. The speaker 25 outputs related audio such as game audio as the game video is reproduced. Note that the operation unit 23, the display unit 24, and the speaker 25 may be integrated with or separate from the reproduction terminal 20.

The game terminal 70 includes a terminal control unit 71, a terminal memory unit 72, a game operation unit 73, a game display unit 74, and an unillustrated communication unit. The terminal memory unit 72 stores the control program of the game terminal 70 and the game program. The terminal control unit 71 controls the game terminal 70 and executes a game program to allow the user to play the game. Furthermore, the game operation unit 73 is an operation device such as a controller or a touch panel and receives an input of a game operation by a user. The game display unit 74 is a display device such as a display or a touch panel and displays the game screen of the game to be played by the user. The game operation unit 73 and the game display unit 74 may be integrated with or separate from the game terminal 70. Furthermore, the game terminal 70 includes an unillustrated audio output device. Note that although the terminal control unit 71 controls the progress of the game by executing the game program, the terminal control unit 71 may control the progress of the game in cooperation with the game control unit 61. For example, the game control unit 61 may control the progress of at least part of the game, and the terminal control unit 71 may display the result thereof on the game display unit 74. Furthermore, the server control unit 11 collects play data from the game terminal 70 and manages the collected play data. Moreover, the server control unit 11 collects a game video, key information for reconstructing the game video, and the like from the game terminal 70.

The reproduction control unit 21 and the terminal control unit 71 are configured as a computer combined from a processor for executing various arithmetic processes and operation controls according to a predetermined program, an internal memory necessary for the operation of the processor, and other peripheral devices. As one example, these processors are CPUs or MPUs, control the entire device based on a predetermined program, and also comprehensively control various processes. Note that the reproduction control unit 21 and the terminal control unit 71 may also perform control according to a program stored on a portable recording medium such as a CD, DVD, CF card, or USB memory, or an external storage medium such as a server on the internet.

The reproduction memory unit 22 and the terminal memory unit 72 are memory devices including a non-transitory computer readable recording medium. The reproduction memory unit 22 and the terminal memory unit 72 include RAM, which is system work memory for the processor to operate, and a memory device such as ROM, an HDD, or an SSD for storing programs and system software. The processor can execute various processing operations such as calculation, control, and discrimination according to the control program stored in the ROM or the HDD. Note that the reproduction storage unit 22 and the terminal storage unit 72 may keep all of the data in one storage device or store the data in a plurality of storage devices in a distributed manner.

[Management Server]

The server control unit 11 of the management server 10 has an operation accepting unit 111 as operation accepting means, an evaluation unit 112 as evaluation means, an effect control unit 113 as effect control means, a compensation accepting unit 114 as compensation accepting means, a screen generation unit 115 as screen generation means, and a distributing unit 116 as distributing means, as logical devices. These logical devices are realized by a combination of the hardware resources of the server control unit 11 and the watching program PG as software resources.

The operation accepting unit 111 accepts viewer operations from the plurality of watching users inputted into the reproduction terminal 20. Therefore, the operation accepting unit 111 executes a guidance instruction for guiding at least one of the operation timing at which the viewer operation should be performed and the operation position where the viewer operation should be performed. Specifically, the operation accepting unit 111 causes the display unit 24 of the reproduction terminal 20 to display the guidance image as a guidance instruction for the viewer operation. As a result, the input timings of the viewer operations by different watching users can be aligned, and thus the exhibition timings of the operation effects exhibited in response to the viewer operations can be aligned as much as possible.

Figure 3:
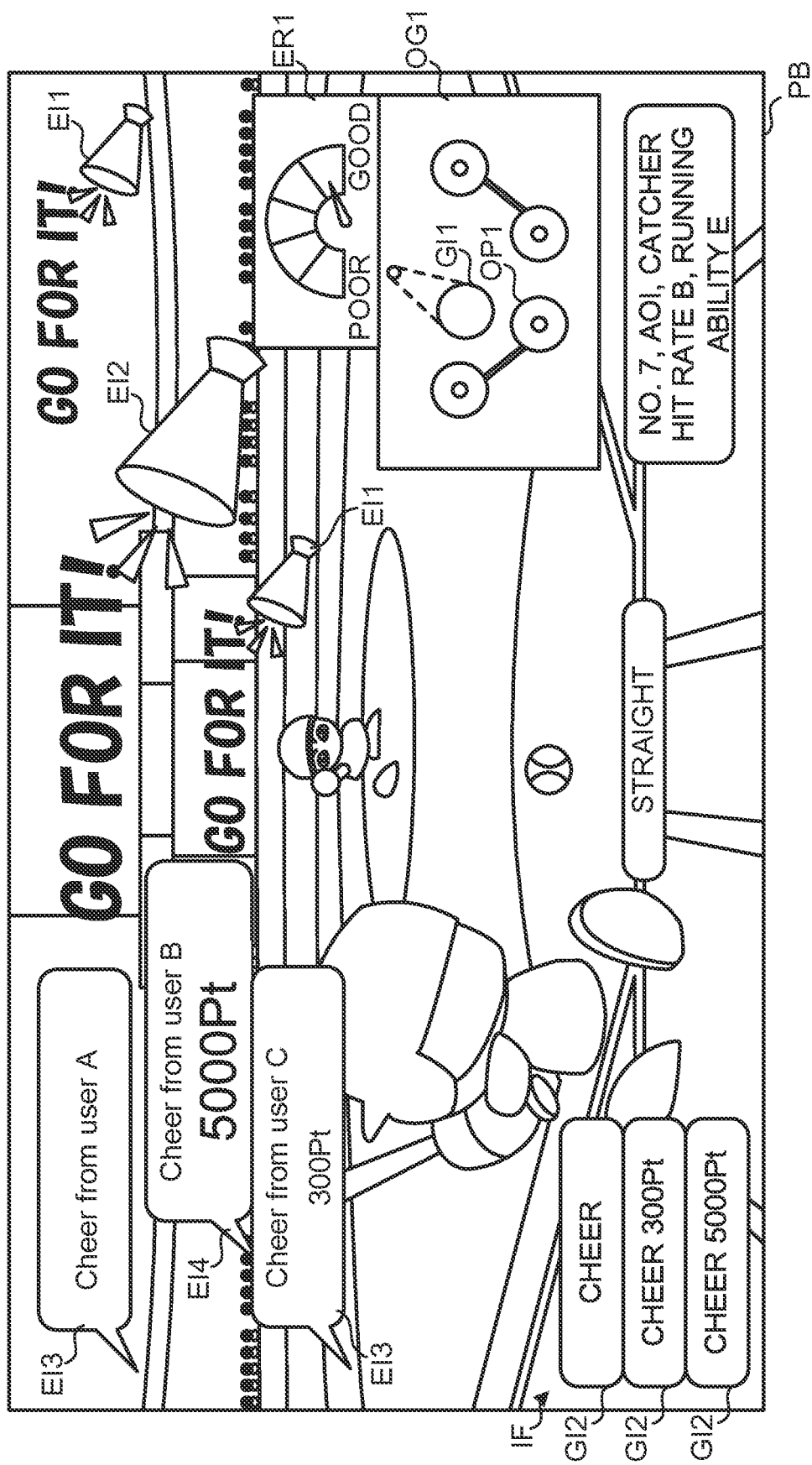
FIG. 3 shows a schematic explanatory diagram of the viewing screen in a first embodiment.

Furthermore, the evaluation result by the evaluation unit 112 can be enhanced according to the result that the input timings of the viewer operations are aligned. As one example, FIG. 3 shows a state in which a guidance image GI1 is displayed in an operation guide field OG1 on the watching screen displayed together with the game video. The guidance image GI1 moves toward an operation position OP1 as time passes.

Then, the watching user touches the operation position OP1 at the timing at which the guidance image GI1 reaches the operation position OP1 and the two overlap each other. As a result, the operation accepting unit 111 acquires the input timing and the input position of the viewer operation from the operation unit 23 of the reproduction terminal 20. Note that instead of displaying on the display unit 24, the operation accepting unit 111 may cause the speaker 25 to output audio indicating the operation timing and the operation position OP1 or cause the reproduction terminal 20 to execute output in another aspect (for example, vibration and the like) indicating the operation timing.

Furthermore, the operation accepting unit 111 may guide only the operation position using the guidance image GI1. For example, when the watching user touches the operation position OP1 instructed by the guidance image GI1 at a desired timing while a cheering song is being played, audio of clapping is outputted. In this case, the timing of touching the operation position OP1 is arbitrarily determined by the watching user. When an operation timing such as the timing of clapping is known to a large number of watching users, the operation accepting unit 111 can omit the guidance of the operation timing. In this case, even when the watching user decides this arbitrarily, the input timing of the viewer operation by the plurality of watching users can be aligned.

Furthermore, the operation accepting unit 111 causes the display unit 24 to display an input field IF for displaying the guidance image GI2 as an operation button in order to execute the guidance instruction for the viewer operation. As one example, a plurality of guidance images GI2 including character strings of "Cheer", "Cheer 300 Pt", and "Cheer 5000 Pt" are displayed in the input field IF of FIG. 3. In order to guide the operation timing, the operation accepting unit 111 displays the operation button at the timing of displaying the cheering message. In the example of FIG. 3, the operation accepting unit 111 displays the operation button at the timing when a pitcher performs a pitching operation. When the watching user touches the operation button, the operation accepting unit 111 accepts the input of the viewer operation, and a predetermined message is displayed as an effect image.

The evaluation unit 112 evaluates the mutual relationship of the inputs of the viewer operations by each of the plurality of watching users. As one example, the mutual relationship is a relationship in which the input timings of a plurality of watching users are close to each other. Specifically, the evaluation unit 112 compares the input timings of the viewer operations by the plurality of watching users and evaluates the mutual relationship. Furthermore, the evaluation unit 112 compares the input timings of the viewer operations by the plurality of watching users based on the reference timing corresponding to the guidance instruction by the operation accepting unit 111. As a result, it is possible to match the input timings of the viewer operations by the plurality of watching users based on the reference timing.

As one example, the reference timing corresponding to the guidance instruction is the operation timing guided by the guidance instruction. Alternatively, the reference timing is a timing at which the operation position is planned to be touched, such as a timing at which applause should be performed, and is set in response to a guidance instruction. Note that the evaluation unit 112 may evaluate one viewer operation in comparison with other viewer operations, or may compare and evaluate a plurality of viewer operations. Furthermore, the evaluation unit 112 may evaluate the viewer operation by one watching user in comparison with the viewer operation by another watching user. Moreover, the evaluation unit 112 may compare and evaluate viewer operations specified from among a plurality of viewer operations by one watching user.

The evaluation unit 112 can identify the input timing with reference to the time when the reproduction of the game video is started or the operation timing instructed by the operation accepting unit 111. For example, when the viewer operation is inputted when 10 minutes have elapsed from the start of reproduction of the game video, the evaluation unit 112 identifies that the input timing is after 10 minutes have elapsed. Furthermore, when the viewer operation is inputted 1 second after the operation timing, the evaluation unit 112 identifies that the input timing is 1 second later. Similarly, when the viewer operation is inputted 1 second before the operation timing, the evaluation unit 112 identifies that the input timing is 1 second before.

As one example, the evaluation unit 112 acquires the input timing of each viewer operation of the plurality of watching users from the operation accepting unit 111. Then, the evaluation unit 112 evaluates that the input timings are simultaneous, or that a plurality of viewer operations included in a predetermined time range are in a close relationship. Furthermore, the evaluation unit 112 evaluates the mutual relationship according to the number of viewer operations in a close relationship. As a result, when the number of viewer operations in close proximity is higher than the predetermined reference value, the evaluation unit 112 determines a high evaluation (GOOD in FIG. 3) as the evaluation result. Conversely, when the number of viewer operations in close proximity is lower than the predetermined reference value, the evaluation unit 112 determines a low evaluation (POOR in FIG. 3) as the evaluation result. In this case, the evaluation unit 112 evaluates the mutual relationship of the inputs of the viewer operations by dividing these into a plurality of levels. Furthermore, the evaluation unit 112 may determine the evaluation result based on the ratio of the number of viewer operations in a close relationship to the total number of viewer operations inputted within a predetermined time range. Furthermore, the evaluation unit 112 may evaluate the mutual relationship numerically or may determine a high evaluation as the evaluation result when the cumulative evaluation result reaches a predetermined value.

Note that the predetermined time range is, for example, a range of 0 to 30 seconds from a predetermined reference. In this case, the evaluation unit 112 determines that a viewer operation inputted within 30 seconds after the first input timing is a close viewer operation. Alternatively, the evaluation unit 112 determines that a viewer operation inputted within 15 seconds before and after the operation timing is a close viewer operation. Furthermore, the evaluation unit 112 may use the median value or the mean value of the input timings of the plurality of viewer operations as a reference.

Furthermore, the evaluation unit 112 outputs the evaluation result to the reproduction terminal 20 together with the game video. In the example of FIG. 3, the evaluation unit 112 causes the display unit 24 to display, in the evaluation result field ER1, an image of a needle that is displaced in conjunction with the evaluation so as to face to the right in FIG. 3, so as to indicate "GOOD" as the evaluation result. Alternatively, the evaluation unit 112 may display a character string, a number, an image, or the like indicating the evaluation result. Furthermore, instead of or in addition to displaying on the display unit 24, the evaluation unit 112 may cause the speaker 25 to output audio indicating the evaluation result or cause the reproduction terminal 20 to execute output in another aspect (for example, vibration and the like) indicating the evaluation result.

The effect control unit 113 causes the reproduction terminal 20 to output an operation effect corresponding to the viewer operation. As one example, the effect control unit 113 causes the display unit 24 to display an operation effect or causes the speaker 25 to output audio. Specifically, the effect control unit 113, based on the evaluation result, executes display of an effect image as the operation effect at the same time as the game video. The effect image is a character string such as "Go for it" and "GOOD," an image of a megaphone, a musical instrument, a balloon, or the like, and other images. Furthermore, the effect control unit 113 may superimpose the effect image on the game video, or may display the effect image so as not to overlap with the game video. Furthermore, the effect control unit 113, based on the evaluation result, executes output of effect audio as the operation effect at the same time as the game video. The effect audio is a cheering song, a musical instrument playing sounds, clapping on beat, clapping, cheering, shouts such as "Go for it," and other audio.

Note that the effect control unit 113 may display a message from the watching user, a meter that changes according to the number of inputs of the viewer operation to indicate the degree of cheering, or an animation as an operation effect. Furthermore, when superimposing the operation effect on the game video, the effect control unit 113 may superimpose the operation effect on a specific part of the game video, for example, an image of a large display included in the game video. Furthermore, the effect control unit 113 may superimpose the wipe image for displaying the operation effect on the game video. Note that the effect control unit 113 may exhibit a negative effect on the game video, such as a character string, an image, or audio indicating a boo, as an operation effect.

Furthermore, the effect control unit 113 controls the operation effect corresponding to the viewer operation so as to change based on the evaluation result of the mutual relationship from the evaluation unit 112. Moreover, the effect control unit 113 changes the operation effect when the evaluation result from the evaluation unit 112 satisfies a predetermined condition. Specifically, the effect control unit 113 controls the operation effect such that the display mode of the effect image or the output mode of the effect audio changes. For example, when the input timings of a large number of viewer operations are close to each other and a high evaluation result is obtained, the effect control unit 113 changes the operation effect by image, audio, vibration, or the like so as to emphasize it. Specifically, the effect control unit 113 displays the image large, in high number, darkly, or brightly, and blinks or moves the image greatly. Alternatively, the effect control unit 113 increases the volume of the audio or repeats the audio. Alternatively, the effect control unit 113 increases the vibration or repeats the vibration. Furthermore, the effect control unit 113 may additionally output a particular performance. For example, the effect control unit 113 may display a performance video.

In the example of FIG. 3, the effect control unit 113 displays a small image of a megaphone and a small character string of "Go for it" as an effect image EI1. Also, the effect control unit 113 displays a large image of the megaphone and a large character string of "Go for it" as an effect image EI2 emphasized with respect to the effect image EI1. Furthermore, the effect control unit 113 displays a message as effect images EI3 and EI4. Moreover, the effect audio may be outputted while displaying an effect image or without displaying an effect image. For example, the effect control unit 113 may cause the speaker 25 to output a quiet "Go for it" sound together with the effect image EI1. Furthermore, the effect control unit 113 may cause the speaker 25 to output loud "Go for it" audio together with the effect image EI2 as a more emphasized effect audio.

As one example, the predetermined conditions for changing the operation effect are satisfied when a high evaluation result is obtained, when the high evaluation result continues for a predetermined time, when the high evaluation result is achieved a predetermined number of times, or the like. Furthermore, the predetermined conditions may be satisfied when a compensation accepting unit 114 determines that the payment of compensation is completed. Also, the effect control unit 113 may exhibit a previously changed operation effect or may change an already exhibited operation effect. For example, the effect control unit 113 may display an effect image emphasized in advance or may change the displayed effect image so as to be emphasized. Furthermore, when the predetermined conditions are satisfied by completing the payment of the compensation, the degree of change may be different depending on the amount of the compensation. For example, when the amount of compensation is large, the degree of emphasis may be stronger, and when the amount of compensation is small, the degree of emphasis may be weaker. When the degree of change is varied according to the amount of compensation, it may be changed for each viewer according to the amount of compensation paid by one viewer, or changed according to the total amount of compensation paid by a plurality of viewers.

The compensation accepting unit 114 accepts the payment of the compensation for the viewer operation. As one example, the compensation accepting unit 114 determines that the compensation will be paid when the watching user selects the operation button of the input field IF. Then, the compensation accepting unit 114 causes the display unit 24 of the reproduction terminal 20 to display a payment screen (not illustrated) for the compensation for the viewer operation. The watching user selects a viewer operation desired to be selected from among the displayed viewer operations via the payment screen. Then, the reproduction terminal 20 transmits payment information including unique billing target information that identifies the selected viewer operation to an unillustrated payment server. The payment server performs payment processing for consuming the charge target compensation corresponding to the charge target information and transmits the result of the payment processing to the reproduction terminal 20 and the management server 10.

When the payment is completed, the reproduction terminal 20 causes the display unit 24 to display the result of the payment processing. When the settlement is completed and the compensation is paid, the compensation accepting unit 114 determines that the payment of the compensation is completed, and notifies the effect control unit 113 of the completion of the payment. Then, the effect control unit 113 exhibits an operation effect corresponding to the viewer operation. In the example of FIG. 3, the effect control unit 113 displays the effect image EI4 as an operation effect corresponding to the viewer operation for which the compensation has been paid. Note that the watching user can pay the compensation using a consumption medium such as token money, virtual currency, cryptographic assets, electronic money, or points. Furthermore, the consumption medium can be purchased in advance or can be purchased after or before the input of the viewer operation.

The viewer operation includes operations that are conditional on consumption of compensation and operations that do not require compensation. By performing the viewer operation on the condition that the compensation is consumed, the operation effect can be exhibited, or the operation effect can be changed. In the example of FIG. 3, the watching user can select an operation button including the character string of "Cheer" displayed in the input field IF and execute a viewer operation that does not require compensation. In this case, the effect control unit 113 displays the message "Cheer from user A" as a normal effect image. Furthermore, the watching user can pay, for example, 300 Pt as a compensation after executing a viewer operation that does not require a compensation for selecting an operation button including the character string of "Cheer" displayed in the input field IF. Alternatively, the watching user can select an operation button including the character string of "Cheer 300 Pt" displayed in the input field IF and execute a viewer operation on the condition that compensation is consumed. In this case, the effect control unit 113 changes the normal effect image and further displays the paid compensation "300 Pt". Note that the effect control unit 113 may change the operation effect in other modes and may, for example, highlight the message.

The effect control unit 113 may control the operation effect so as to change the display mode of the effect image or the output mode of the effect audio when the compensation is paid for the viewer operation. For example, the effect control unit 113 changes so as to emphasize the operation effect using the image, audio, vibration, or the like when the compensation is paid. In the example of FIG. 3, when the operation accepting unit 111 accepts the operation of the watching user with respect to the operation button displayed in the input field IF, the effect control unit 113 displays the emphasized message as the effect image EI4.

At this time, when the compensation is paid, the effect control unit 113 changes the display mode such that the effect image is emphasized. In the example of FIG. 3, the effect control unit 113 displays a large character string of "5000 Pt" as the effect image EI4 emphasized with respect to the effect image EI3. Alternatively, the effect control unit 113 may, when the compensation is paid, change the display mode of the effect image or the output mode of the effect audio according to the amount of the compensation. In the example of FIG. 3, the effect control unit 113 changes the display mode of the effect image so as to display the amount of compensation. Furthermore, when an area for inputting a message is provided, the effect control unit 113 may display the message inputted by the watching user via the operation unit 23.

Figure 4:
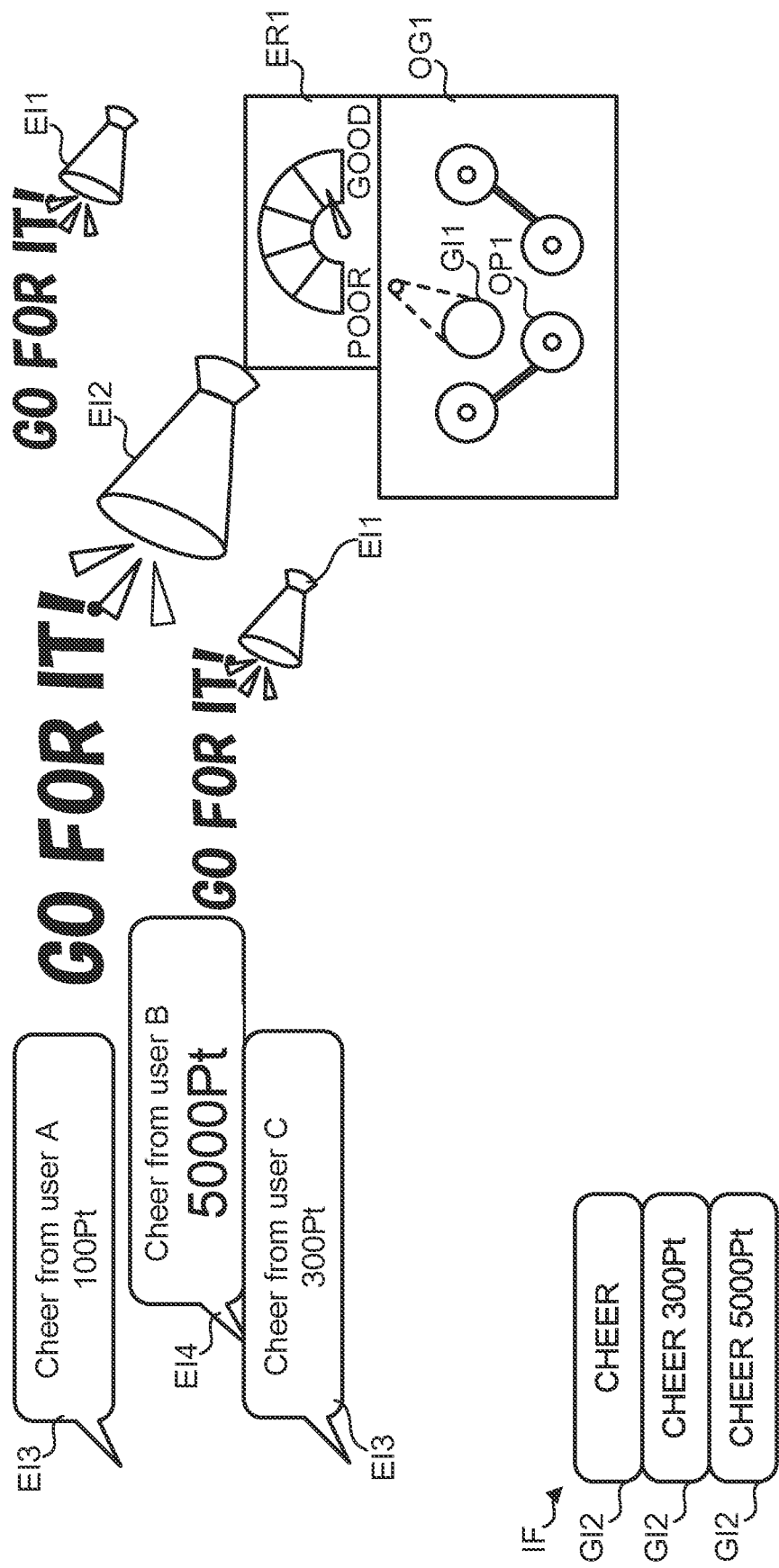
FIG. 4 shows a schematic explanatory diagram of a watching screen.

The screen generation unit 115 acquires various data such as images from the operation accepting unit 111, the evaluation unit 112, the effect control unit 113, and the compensation accepting unit 114 and generates a watching screen displayed at the same time as the game video. The watching screen is generated as an image or a video. For example, the screen generation unit 115 generates a watching screen in various formats, such as an MPEG format. In the example of FIG. 3, the screen generation unit 115 includes a game video display area PB, an unillustrated control area, and the watching screen (FIG. 4). As shown in FIG. 4, the watching screen includes effect images EI1, EI2, EI3, the evaluation result field ER1, the operation guide field OG1, and the input field IF.

The screen generation unit 115 disposes the generated watching screen superimposed on the game video. As one example, an upper layer including the watching screen is superimposed on a lower layer including the display area of the game video. The upper layer is configured as a transparent image so as to not interfere with the display of the game video. Then, on the upper layer, each image is displayed at the timing of displaying each of the effect images EI1, EI2, EI3, the evaluation result field ER1, the operation guide field OG1, and the input field IF. For example, when a viewer operation is inputted, the effect images EI1, EI2, and EI3 are displayed on the upper layer. Alternatively, when the watching user performs a predetermined operation, the effect images EI1, EI2, EI3, the evaluation result field ER1, the operation guide field OG1, or the input field IF may be displayed on the upper layer. Alternatively, the screen generation unit 115 may dispose the watching screen so as to not overlap with the game video.

The distributing unit 116 distributes the game video and the watching screen to the reproduction terminal 20 in order to provide the watching service. As one example, the distributing unit 116 displays the game video and the watching screen on a web page to be accessed by a watching user.

[Flow of Processing by Watching System]

Figure 5:
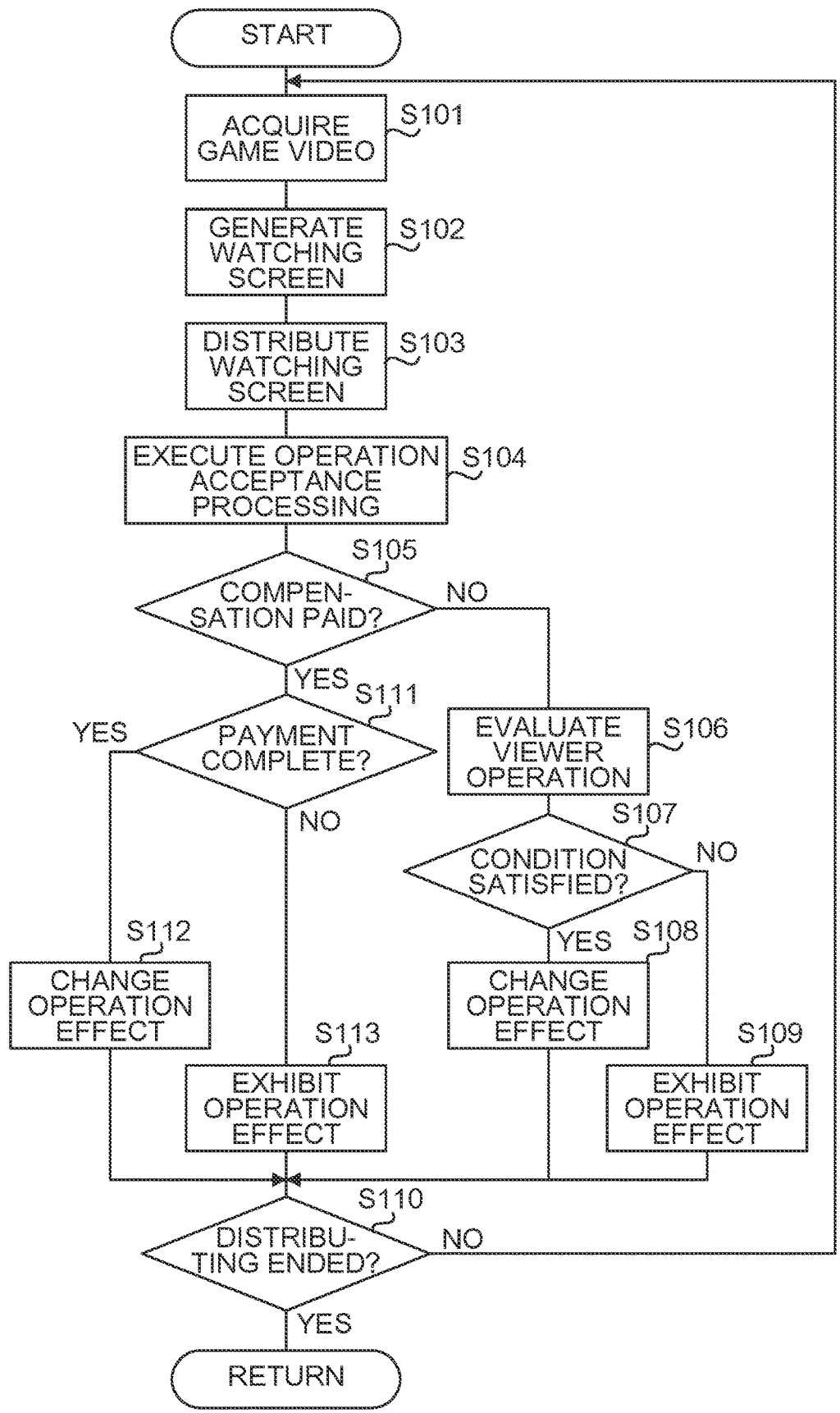
FIG. 5 shows a flow chart of processing in the first embodiment.

The flow of processing by the watching system 100 will be described with reference to FIG. 5. The watching system 100 starts processing when a predetermined start condition is satisfied. For example, in the case of live distributing, the watching system 100 starts processing when video capture starts.

The server control unit 11 of the management server 10 acquires the game video from the distributing server 30 (S101). Then, the screen generation unit 115 acquires data for displaying the operation guidance field OG1 from the operation accepting unit 111, and further acquires data for displaying the evaluation result field ER1 from the evaluation unit 112, to generate the watching screen (S102). Subsequently, the distributing unit 116 distributes the game video and the watching screen to the reproduction terminal 20 (S103). Then, the reproduction terminal 20 causes the display unit 24 to display the game video and the watching screen.

When the timing of accepting the viewer operation, for example, the timing of distributing a competition part is reached, the operation accepting unit 111 executes an operation accepting process for accepting the viewer operation (S104) and displays a guidance image GI1 in the operation guide field OG1 to guide the operation timing and the operation position OP1. Furthermore, the operation accepting unit 111 displays a guidance image GI2 in the input field IF. Therefore, the screen generation unit 115 generates a watching screen such that the guidance images GI1 and GI2 are displayed. Then, the distributing unit 116 distributes the generated watching screen.

Note that the operation accepting unit 111 may use audio included in the game video, a game status, an elapsed time from the start of reproduction, a timestamp, or timing information added by the person uploading or distributing the game video to specify timing for accepting the viewer operation. Additionally, the timing for accepting the viewer operation may be as timing at which the game status has changed, for example, when the bottom of a seventh inning starts, when a match opponent is winning or losing, when a score is added, when a game character appears, or the like.

In the operation accepting process, the operation accepting unit 111 uses watching data OD stored in the server memory unit 12. As one example, the watching data OD includes image data, music data, and sequence data. The image data includes, for example, data such as icons, various objects, and a background in addition to the guidance images GI1 and GI2. Furthermore, the music data includes data such as musical tones, music pieces, and sound effects. Also, the sequence data is data that defines an operation procedure and includes, for example, data such as a display timing of the guidance image GI1, a type of the guidance image GI1, and the operation timing.

Then, the operation accepting unit 111 guides the operation timing and the operation position OP1 using the guidance image GI1 moving toward the operation position OP1. For example, in the example of FIG. 3, the operation accepting unit 111 reads from the sequence data the operation timing at which each of the plurality of operation positions OP1 should be touched. Then, the operation accepting unit 111 determines by back-calculating the timing at which the guidance image GI1 appears at the appearance position while referencing information on a movement speed of the guidance image GI1. Afterward, the operation accepting unit 111 moves the guidance image GI1 toward the operation position OP1 according to the referenced movement speed. Then, when the watching user touches the operation position OP1, the operation accepting unit 111 acquires the input timing and the input position of the viewer operation. Note that although the act of the watching user touching the operation position OP1 is a viewer operation that does not require compensation in the present specification, it may be a viewer operation that requires compensation.

When the watching user, for example, touches the operation position OP1 without touching the operation button of the input field IF as a viewer operation for cheering, the compensation accepting unit 114 does not determine that the compensation will be paid (NO in S105). Then, the evaluation unit 112 evaluates the mutual relationship of the inputs of the viewer operations by each of the plurality of watching users (S106). Furthermore, the effect control unit 113 determines whether a predetermined condition is satisfied by referencing the evaluation result of the mutual relationship by the evaluation unit 112 (S107). When a predetermined condition is satisfied (YES in S107), the effect control unit 113 changes the operation effect (S108) and, for example, exhibits an emphasized operation effect. Conversely, when the predetermined condition is not satisfied (NO in S107), the effect control unit 113 exhibits a normal operation effect (S109).

Afterward, when the distributing is terminated due to a reason such as the game video being reproduce to the end (YES in S110), the watching system 100 ends the process. Conversely, when the distributing is continued (NO in S110), the watching system 100 repeats the processing. Note that the effect control unit 113 uses the watching data OD stored in the server memory unit 12 in order to exhibit or change the operation effect. As one example, the watching data OD includes image data of the effect image and music data of the effect audio.

Furthermore, in the operation accepting process, when the watching user touches the operation button of the input field IF, the operation accepting unit 111 acquires the type of the viewer operation as the selected operation button according to the input position of the viewer operation. The compensation accepting unit 114 acquires the type of the viewer operation from the operation accepting unit 111 and determines that the compensation may be paid (YES in S105). Then, the compensation accepting unit 114 causes the display unit 24 to display the payment screen. Furthermore, the compensation accepting unit 114 determines whether the payment of the compensation is completed through the settlement process (S111). Then, when the compensation accepting unit 114 determines that the payment of the compensation is completed (YES in S111), the compensation accepting unit 114 notifies the effect control unit 113 of the completion of the payment.

When the compensation is thus paid, the effect control unit 113 changes the operation effect (S112) and, for example, exhibits an emphasized operation effect. Conversely, when the compensation is not paid (NO in S111), for example, when the watching user selects a type of viewer operation that does not require compensation, depending on the type of viewer operation acquired from the operation accepting unit 111, the effect control unit 113 exhibits a normal operation effect (S113). Afterward, when the distributing is terminated due to a reason such as the game video being reproduce to the end (YES in S110), the watching system 100 ends the process. Conversely, when the distributing is continued (NO in S110), the watching system 100 repeats the processing.

According to the first embodiment described above, it is possible to give relevance to the effects exhibited in response to the operations by the plurality of watching users. That is, the mutual relationship between the inputs of the viewer operations by each of the plurality of watching users is evaluated, and the operation effect changes according to the evaluation result. Therefore, the watching user can obtain a sense of solidarity with other watching users, and the watching user's desire to watch is improved. Furthermore, when the mutual relationship receives a high evaluation, for example, when the inputs of the viewer operation by each of the plurality of watching users are close to each other, the operation effect changes and, for example, the cheering content is emphasized. Therefore, the watching user can get a reward in that the effect of the cheering act is improved. As a result, it is possible to give watching users a motivation to cooperatively perform the cheering act. Furthermore, it is possible to provide the watching user with a simulated experience as when a plurality of watching users perform the cheering act as one.

Note that when the watching user pays the compensation, a benefit may be given to the distributor of the game video, the watching user, the player of the game, or the team playing the game. For example, at least a part of the compensation paid by the watching user may be used to be given to the player of the game as a benefit. Additionally, a benefit for advancing the game in an advantageous manner may be given to the player of the game according to the amount of compensation paid by the watching user. Benefits for advancing the game are, for example, experience points consumed when training characters of the game, and improvement of abilities of the characters of the game. The details of these benefits can be determined by the game control unit 61 based on information of the amount of compensation provided from the management server 10 to the game server 60. Note that examples of cases in which at least part of the compensation is given as a benefit are a case in which the compensation is directly given and a case in which the compensation is converted into a currency that can be used in the game, or the like.

Furthermore, depending on the evaluation result by the evaluation unit 112, a benefit may be given to the distributor of the game video, the watching user, the player of the game, or the team playing the game. For example, when a high evaluation result is obtained, a benefit for advancing the game in an advantageous manner may be given to the player of the game. The game server 60 can acquire the evaluation result by the evaluation unit 112 from the management server 10 and determine the contents of the benefit according to the evaluation result.

Furthermore, the effect control unit 113 may exhibit the operation effect at the same time as the viewer operation or may exhibit the operation effect when a predetermined time has elapsed from the viewer operation. Moreover, the effect control unit 113 may exhibit an operation effect for when the predetermined condition is satisfied at the same time as the timing when the condition is satisfied or when a predetermined time elapses from the timing when the condition is satisfied. Additionally, the effect control unit 113 may exhibit an operation effect in association with a progress status of the game. For example, the evaluation unit 112 may evaluate in advance a plurality of viewer operations inputted at the operation timing guided by the guidance image GI1, and the effect control unit 113 may exhibit an operation effect according to the evaluation result at a specific timing determined by the progress status of the game. As one example, the specific timing is a timing in a baseball game from after an end of the top of a seventh inning to a timing before a start of the bottom of the seventh inning, and the effect control unit 113 displays an operation effect of making a balloon fly at the timing.

Second Embodiment

Figure 6:
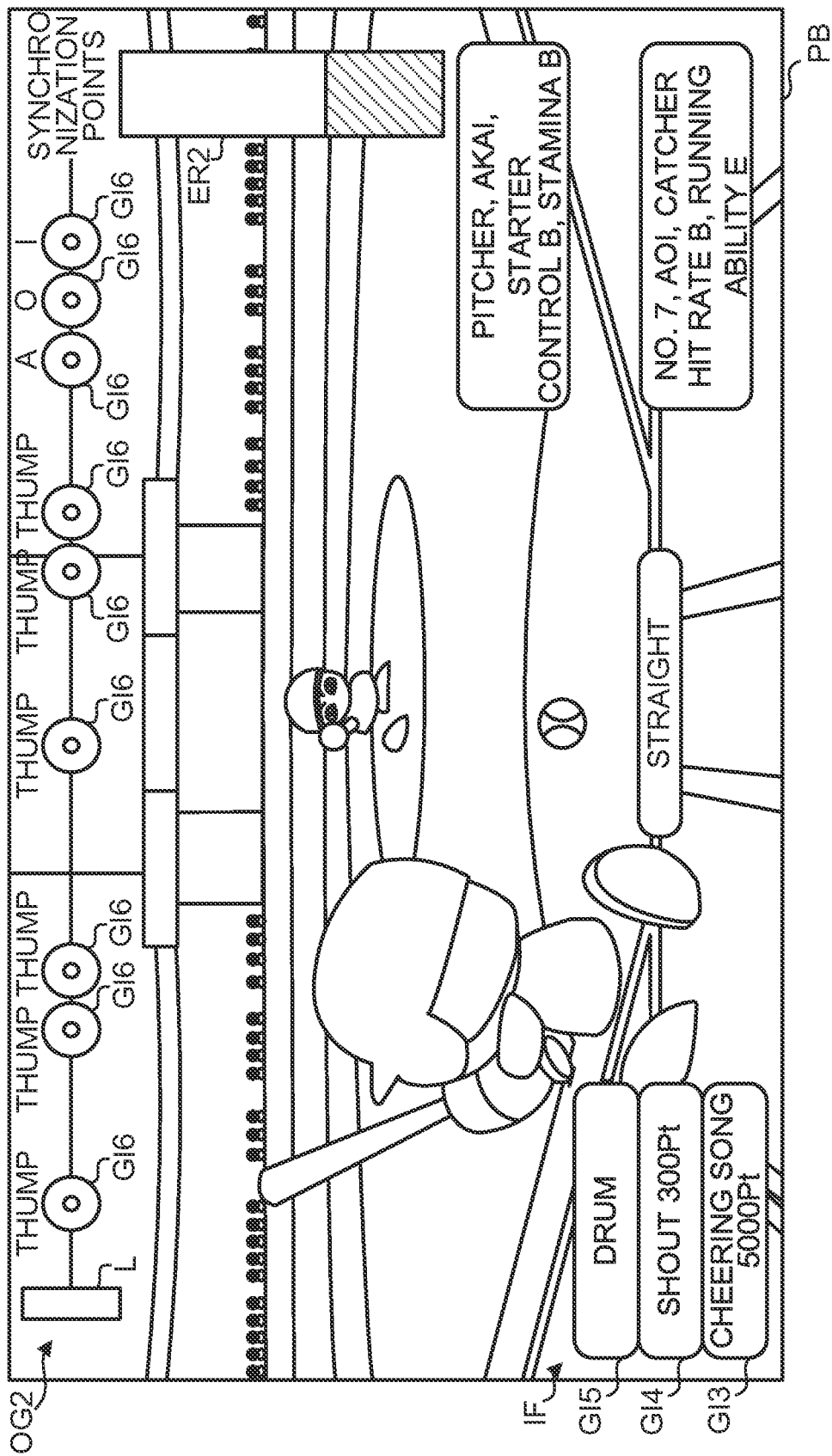
FIG. 6 shows a schematic explanatory diagram of the viewing screen in a second embodiment.
Figure 7:
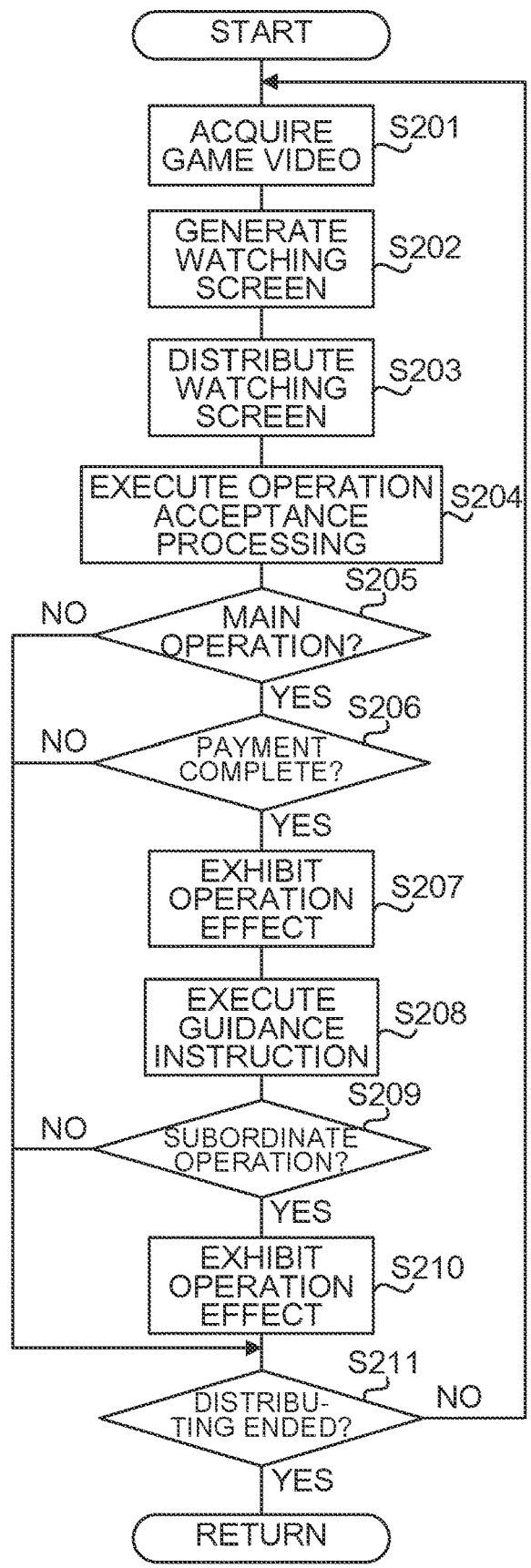
FIG. 7 shows a flow chart of processing in the second embodiment.

Next, a second embodiment will be described with reference to FIGS. 6 and 7. Note that in the description of the second embodiment, mainly differences from the first embodiment will be described, and the same reference numbers may be assigned to the components already described and the description thereof are omitted. Unless otherwise specified, components assigned the same reference numerals perform substantially the same operation and function, and the operations and effects thereof are also substantially the same.

A watching user who watches the distributed video may wish to exhibit an effect that affects the distributed video in response to the watching user's own operation. For example, when a game video is distributed, a watching user may wish to output performances such as audio of applause and an image of a cheering message at the same time as the game video in order to cheer on the player playing the game. In this case, since the watching user performs each operation, the performance corresponding to each operation is also outputted at respective timings. Therefore, it is difficult for the watching user to obtain a sense of solidarity with other watching users.

Also, in the second embodiment, the operation accepting unit 111 accepts a subordinate operation when a main operation is accepted. As a result, a plurality of watching users can cooperatively realize a cheering action composed of an operation effect by the main operation and an operation effect by the subordinate operation. Therefore, the watching user can obtain a sense of solidarity with other watching users, and the watching user's desire to watch is improved.

The operation accepting unit 111 of the second embodiment accepts the main operation on the condition of consumption of compensation as the viewer operation, and when the main operation is accepted, the operation accepting unit 111 accepts the subordinate operation as the viewer operation. In the example of FIG. 6, the main operation is a viewer operation for outputting a cheering song on the condition that a compensation of 5000 Pt is consumed. Furthermore, the subordinate operations are a viewer operation for outputting audio of a shout on the condition that a compensation of 300 Pt is consumed and a viewer operation for outputting a sound of a drum without requiring a compensation.

The operation accepting unit 111 displays a guidance image GI3, which is also an operation button, in the input field IF as a guidance instruction for the main operation. As one example, the guidance image GI3 including a character string of "Cheering song 5000 Pt" is displayed in the input field IF of FIG. 6. The character string of "5000 Pt" displayed by the operation accepting unit 111 indicates the amount of compensation to be consumed. Furthermore, when the operation accepting unit 111 accepts the main operation from the watching user, the operation accepting unit 111 displays guidance images GI4 and GI5, which are also operation buttons, in the input field IF as the guidance instruction of the subordinate operation. As one example, in the input field IF of FIG. 6, the guidance image GI4 including a character string of "Shout 300 Pt" and the guidance image GI5 including a character string of "Drum" are displayed.

The operation accepting unit 111 displays a guidance instruction for a subordinate operation when the main operation is accepted. As one example, the operation accepting unit 111 acquires the subordinate operation associated with the accepted main operation from the server memory unit 12. Then, the operation accepting unit 111 causes the display unit 24 to display the guidance image of the associated subordinate operation. Alternatively, when the operation accepting unit 111 accepts the main operation, the selection button may be displayed on the watching screen of the watching user who has executed the main operation. The watching user can select a subordinate operation to be associated with the main operation by touching a selection button. Then, the operation accepting unit 111 causes the display unit 24 to display a guidance image of a subordinate operation associated by the watching user. Thus, the operation accepting unit 111 can execute the guidance instruction of the subordinate operation when the main operation is accepted. As a result, the operation accepting unit 111 can accept the subordinate operation when the main operation is accepted. Alternatively, the operation accepting unit 111 may be configured to not accept the subordinate operation even when the guidance image of the displayed subordinate operation is selected when the main operation is not accepted.

Furthermore, the operation accepting unit 111 causes the display unit 24 to display a guidance image GI6 that guides the operation timing at which the subordinate operation should be performed in coordination with the determination line L as a guidance instruction for the subordinate operation. Then, the operation accepting unit 111 instructs the operation timing of the subordinate operation using the guidance image GI6, which is a guidance instruction. In the example of FIG. 6, the operation accepting unit 111 moves the determination line L from the left to the right in FIG. 6 in an operation guide field OG2 as time passes. Then, the watching user performing the subordinate operation touches the guidance images GI4 and GI5 at the timing when the determination line L reaches each guidance image GI6 and the two overlap. As a result, the operation accepting unit 111 acquires the input timing and the input position as the input operation from the operation unit 23 of the reproduction terminal 20. Alternatively, the position touched by the user may be set to a position where the guidance image GI6 and the determination line L overlap, another button image, and an arbitrary position of the display unit 24. For example, when the position touched by the user is the position where the guidance image GI6 and the determination line L overlap, the watching user touches either the guidance image GI4 or the guidance image GI5 before starting the touch to the overlapping position, and it is possible to set whether the viewer operation to be performed incurs compensation. That is, when the guidance image GI4 is touched and there is such a setting, it may be configured such that compensation is incurred by the first touch operation on the overlapping position during a cheering period (for example, until the performance of one cheering song is completed), and compensation is not incurred by the touch operation on the overlapping position thereafter. Furthermore, it may be configured such that when the overlapping position is touched in a situation where either of the guidance images GI4 and GI5 are not touched, no compensation is occurred as a default.

The evaluation unit 112 evaluates the mutual relationship of the inputs corresponding to the subordinate operations by each of the plurality of watching users. Furthermore, the evaluation unit 112 evaluates the mutual relationship according to the number of subordinate operations in a close relationship. In the example of FIG. 6, the evaluation unit 112 accumulates points corresponding to the number of subordinate operations in a close relationship as the evaluation result. Then, the evaluation unit 112 displays the evaluation result in an evaluation result field ER2 on the reproduction terminal 20 together with the game video. The evaluation unit 112 determines a high evaluation as the evaluation result when the cumulative evaluation result reaches a predetermined value.

The effect control unit 113 causes the display unit 24 to display the operation effects corresponding to the main operation and the subordinate operation, or causes the speaker 25 to output audio. In the example of FIG. 6, when the watching user selects the guidance image GI3 as the main operation, the effect control unit 113 causes the speaker 25 to output the audio of the cheering song. Here, the effect control unit 113 may further cause the display unit 24 to display lyrics of the cheering song. Furthermore, when the watching user selects the guidance image GI5 as the subordinate operation, the effect control unit 113 causes the speaker 25 to output audio of a playing sound of a drum. Moreover, when the watching user selects the guidance image GI4 as the subordinate operation, the effect control unit 113 causes the speaker 25 to output audio of a shout (for example, a shout of a player's name). When the subordinate operation is selected, the effect control unit 113 further causes the display unit 24 to display an image indicating audio (for example, a character string of "Bang" indicating the sound of a drum and a character string of "Aoi" indicating a shout).

The subordinate operation may be an operation for executing a particular performance. For example, the operation accepting unit 111 displays a guidance image including a character string of "Balloon" as a guidance instruction for a subordinate operation. Then, when the watching user touches the guidance image, the effect control unit 113 displays a performance image of making a balloon fly. As a result, a plurality of watching users can cooperate to exhibit a plurality of operation effects in different forms such as audio output of a cheering song and displaying a performance image. Therefore, the watching users can cooperatively execute cheering composed of a plurality of operation effects of different forms.

Furthermore, the effect control unit 113 controls the operation effect corresponding to the subordinate operation so as to change based on the evaluation result of the mutual relationship by the evaluation unit 112. Moreover, the effect control unit 113 changes the operation effect corresponding to the subordinate operation when the evaluation result by the evaluation unit 112 satisfies a predetermined condition. In the example of FIG. 6, the evaluation unit 112 determines a high evaluation as the evaluation result when synchronization points, which are the cumulative evaluation result, reach a predetermined value. When a high evaluation is determined, the effect control unit 113 additionally outputs a particular performance as a changed operation effect. For example, the effect control unit 113 repeats the outputted cheering song again. As a result, the watching user can input the subordinate operation again.

The compensation accepting unit 114 accepts the payment of the compensation for the viewer operation. As one example, the compensation accepting unit 114 determines that the compensation will be paid when the watching user selects the operation button of the input field IF. Then, the compensation accepting unit 114 causes the display unit 24 of the reproduction terminal 20 to display a payment screen (not illustrated) for the compensation for the viewer operation. When the settlement is completed and the compensation is paid, the compensation accepting unit 114 determines that the payment of the compensation is completed, and notifies the effect control unit 113 of the completion of the payment.

Then, the effect control unit 113 controls the operation effect of the subordinate effect so as to change the display mode of the effect image or the form of output of the effect audio when the compensation is paid for the subordinate operation. For example, the effect control unit 113 emphasizes and outputs more loudly the audio of the playing sound of the drum or the audio of the shout as the operation effect corresponding to the subordinate operation for which the compensation has been paid. Furthermore, the effect control unit 113 may repeat the outputted cheering song again as a particular performance. As a result, the watching user can input the subordinate operation again.

The screen generation unit 115 acquires various data such as images from the operation accepting unit 111, the evaluation unit 112, the effect control unit 113, and the compensation accepting unit 114 and generates a watching screen displayed at the same time as the game video. In the example of FIG. 6, the screen generation unit 115 generates a watching screen including the evaluation result field ER2, the operation guide field OG2, and the input field IF.

[Flow of Processing by Watching System]

The flow of processing by the watching system 100 in the second embodiment will be described with reference to FIG. 7. Note that in FIG. 7, illustration of the flow of some of the processing already described is omitted for convenience of description.

The watching system 100 starts processing when a predetermined start condition is satisfied. Then, the server control unit 11 of the management server 10 acquires the game video from the distributing server 30 (S201). Then, the screen generation unit 115 acquires data for displaying the operation guidance field OG2 from the operation accepting unit 111, and further acquires data for displaying the evaluation result field ER2 from the evaluation unit 112 to generate the watching screen (S202). Subsequently, the distributing unit 116 distributes the game video and the watching screen to the reproduction terminal 20 (S203). As a result, the reproduction terminal 20 causes the display unit 24 to display the game video and the watching screen.

When the timing for accepting the main operation is reached, the operation accepting unit 111 executes an operation accepting process (S204) and displays the guidance image GI3 in the input field IF. Furthermore, the screen generation unit 115 generates a watching screen such that the guidance image GI3 is displayed. Then, the distributing unit 116 distributes the generated watching screen. For example, the timing of accepting the main operation is a timing at which a competition part is distributed, a timing at which the bottom of the seventh inning starts, a timing at which a bout ends, and the like.

In the operation accepting process, when the watching user touches the operation button of the input field IF, the operation accepting unit 111 acquires the type of the viewer operation as the selected operation button according to the input position of the viewer operation. The compensation accepting unit 114 acquires the type of the viewer operation from the operation accepting unit 111, and when it is determined that this is a main operation (YES in S205), determines that payment of compensation may be incurred. Then, the compensation accepting unit 114 causes the display unit 24 to display the payment screen. Furthermore, the compensation accepting unit 114 determines whether the payment of the compensation is completed through the settlement process (S206). Then, when the compensation accepting unit 114 determines that the payment of the compensation is completed (YES in S206), the compensation accepting unit 114 notifies the effect control unit 113 of the completion of the payment.

When the compensation is paid, the effect control unit 113 exhibits the operation effect of the main operation (S207). For example, the effect control unit 113 causes the speaker 25 to output a cheering song. Conversely, when it is not a main operation (NO in S205), for example, when a viewer operation other than touching the operation button in the input field IF is performed, the effect control unit 113 exhibits a normal operation effect. Afterward, when the distributing is terminated due to a reason such as the game video being played to the end (YES in S211), the watching system 100 ends the process. Conversely, when the distributing is continued (NO in S211), the watching system 100 repeats the processing. Furthermore, the same applies when the compensation has not been paid (NO in S206). That is, the watching system 100 ends the process when the distributing is terminated (YES in S211). Conversely, the watching system 100 repeats the process when the distributing is continued (NO in S211).

Furthermore, when the compensation for the main operation is paid, the operation accepting unit 111 displays the guidance image GI6 in the operation guide field OG2 to guide the operation timing of the subordinate operation (S208). Furthermore, the operation accepting unit 111 displays the guidance images GI4 and GI5 in the input field IF to guide the operation position of the subordinate operation (S208). Moreover, the screen generation unit 115 generates a watching screen such that the guidance images GI4 and GI5 are displayed. Then, the distributing unit 116 distributes the generated watching screen.

When the watching user touches the guidance images GI4, GI5 of the input field IF, the operation accepting unit 111 acquires the type of the selected viewer operation according to the input position of the viewer operation. Then, the effect control unit 113 exhibits the operation effect of the subordinate operation according to the type of the viewer operation acquired from the operation accepting unit 111 (S210). Here, the effect control unit 113 may control the operation effect so as to change the display mode of the effect image or the form of output of the effect audio when the compensation is paid for the subordinate operation.

Furthermore, in the operation accepting process, the operation accepting unit 111 uses watching data OD stored in the server memory unit 12. In the example of FIG. 6, the operation accepting unit 111 guides the operation timing of the subordinate operation using the determination line L and the guidance image GI6. Then, when the watching user touches the guidance images GI4, GI5 of the input field IF, the operation accepting unit 111 acquires the input timing and input position of the viewer operation. Furthermore, the evaluation unit 112 evaluates the mutual relationship of the inputs of the viewer operations by each of the plurality of watching users.

Also, the effect control unit 113 determines whether a predetermined condition is satisfied by referencing the evaluation result of the mutual relationship by the evaluation unit 112. When a predetermined condition is satisfied, for example, when cumulative synchronization points reach a predetermined value, the effect control unit 113 changes and exhibits the operation effect of the subordinate operation (S210). Conversely, when the predetermined condition is not satisfied, the effect control unit 113 exhibits a normal operation effect (S210). Afterward, when the distributing is terminated due to a reason such as the game video being played to the end (YES in S211), the watching system 100 ends the process. Conversely, when the distributing is continued (NO in S211), the watching system 100 repeats the processing.

According to the second embodiment described above, it is possible to give relevance to the effects exhibited in response to the operations by the plurality of watching users. That is, the operation accepting unit 111 accepts the subordinate operation when the main operation is accepted. As a result, a plurality of watching users can cooperatively realize a cheering action composed of an operation effect by the main operation and an operation effect by the subordinate operation. Therefore, the watching user can obtain a sense of solidarity with other watching users, and the watching user's desire to watch is improved. Furthermore, it is possible to provide the watching user with a simulated experience as when a plurality of watching users perform the cheering act as one.

Note that in the second embodiment, the evaluation unit 112 may or may not evaluate the mutual relationship between the inputs of the viewer operations. Furthermore, a subordinate operation may be executed by the watching user who executed the main operation. For example, the watching user who executed the main operation may execute the subordinate operation together with another user. Alternatively, the operation accepting unit 111 may be configured to not accept the subordinate operation from the watching user who executed the main operation. For example, the operation accepting unit 111 need not display the input field IF of the subordinate operation on the watching screen being viewed by the watching user who has executed the main operation. Furthermore, when main operations by a plurality of watching users are redundant, the operation accepting unit 111 may accept only the earliest main operation received by the management server 10. In this case, an image indicating an error may be displayed for subsequent main operations. Furthermore, when the main operations are redundant, the operation accepting unit 111 may accept a plurality of main operations that have arrived within a predetermined time from the earliest received main operation. In this case, the compensation accepting unit 114 may charge each watching user an amount obtained by equally dividing the compensation for the main operation by the number of the plurality of watching users who have inputted the accepted main operation. Note that the redundancy of the main operation refers to, in a state in which a main operation is received and an operation effect corresponding to the main operation (for example, the performance of a cheering song) is not completed, additionally receiving main operation from a one of watching users.

Third Embodiment

Figure 8:
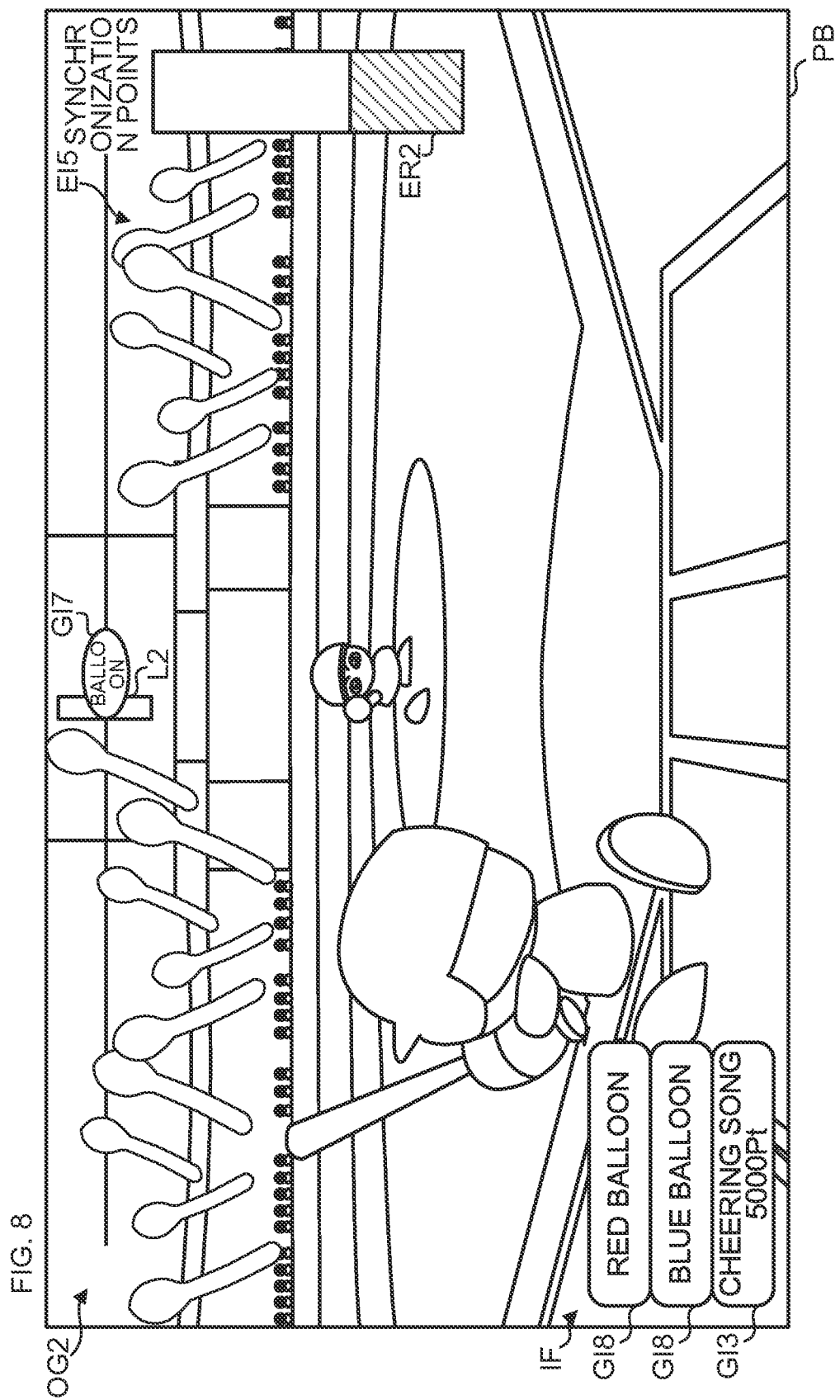
FIG. 8 shows a schematic explanatory diagram of the viewing screen in a third embodiment.
Figure 9:
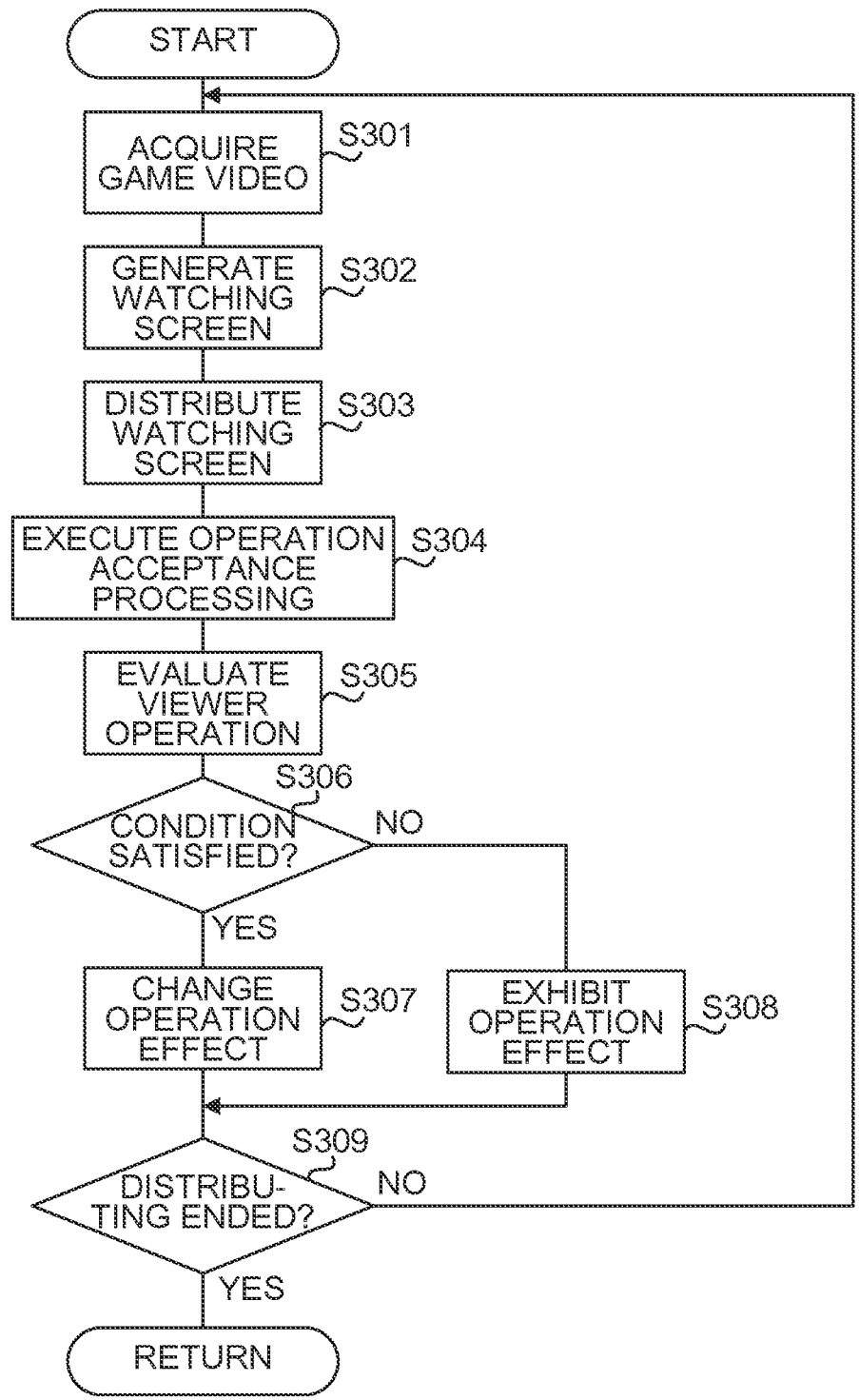
FIG. 9 shows a flow chart of processing in the third embodiment.

Next, a third embodiment will be described with reference to FIGS. 8 and 9. Note that in the description of the third embodiment, mainly differences from the first and second embodiments will be described, and the same reference numbers may be assigned to the components already described and the description thereof are omitted. Unless otherwise specified, components assigned the same reference numerals perform substantially the same operation and function, and the operations and effects thereof are also substantially the same.

A watching user who watches the distributed video may wish to exhibit an effect that affects the distributed video in response to the watching user's own operation. For example, when a game video is distributed, a watching user may wish to output performances such as audio of applause and an image of a cheering message at the same time as the game video in order to cheer on the player playing the game. In this case, since the watching user performs each operation, the performance corresponding to each operation is also outputted at respective timings. Therefore, it is difficult for the watching user to obtain a sense of solidarity with other watching users.

In the third embodiment, the operation accepting unit 111 causes the display unit 24 to display a guidance image that guides the operation timing at which the viewer operation should be performed as a guidance instruction for the viewer operation. As a result, it is possible to give relevance to the effects exhibited in response to the operations by the plurality of watching users. That is, the input timings of the viewer operations by different watching users can be aligned, and thus the exhibition timings of the operation effects exhibited in response to the viewer operations can be aligned as much as possible. Therefore, the watching user can obtain a sense of solidarity with other watching users, and the watching user's desire to watch is improved.

Furthermore, when the performance is outputted irregularly, it gives a complicated impression to the watching users watching the game video and reduces the desire to watch. Therefore, in the third embodiment, the effect control unit 113 exhibits the operation effect based on the input timing of the viewer operation. As a result, it is possible to align the timing of exhibiting the operation effect corresponding to the viewer's operation as much as possible. Therefore, it is possible to avoid giving a complicated impression to the watching users who are watching the game video.

The operation accepting unit 111 causes the display unit 24 to display a guidance image that guides the operation timing at which the viewer operation should be performed as a guidance instruction for the viewer operation. In the example of FIG. 8, the operation accepting unit 111 displays an image including a character string of "Balloon" as a guidance image GI7 for guiding the operation timing. Furthermore, the operation accepting unit 111 displays a guidance image GI8 including a character string of "Red balloon" and a guidance image GI8 including a character string of "Blue balloon" in the input field IF as guide instructions for the viewer operation to exhibit the operation effect of causing a balloon to fly. The watching user can exhibit the operation effect by touching the guidance image GI8 at the target operation timing. For example, the operation accepting unit 111 outputs a cheering song from the speaker 25 at the start of the bottom of the seventh inning. Then, the operation accepting unit 111 guides the watching user by coordination between the guidance image GI7 and the determination line L2 with the timing at which the cheering song ends as the operation timing.

As one example, the operation accepting unit 111 uses the watching data OD stored in the server memory unit 12 to guide the operation timing. The operation accepting unit 111 reads the operation timing at which the guidance image GI8 should be touched from the sequence data of the watching data OD. Then, the operation accepting unit 111 determines by back-calculating the timing at which the guidance image GI7 appears at the appearance position while referencing information on a movement speed of the determination line L2. Afterward, the operation accepting unit 111 moves the determination line L2 from the left to the right in FIG. 8 toward the guidance image GI7 according to the referenced movement speed.

The watching user causes a team-colored balloon of the team the watching user is cheering on to fly according to the guided operation timing. For example, when the team color is red, the watching user touches the guidance image GI8 including the character string of the "Red balloon" at the timing when the determination line L2 reaches (overlaps) the guidance image GI7. Then, the operation accepting unit 111 acquires the input timing and the input position of the viewer operation. When the watching user follows the guidance instruction, the input timings of the viewer operations by different watching users can be aligned as much as possible. As shown in FIG. 8, when the timings of the viewer operations of a large number of watching users are concentrated at the same time, the effect images EI5 of a large number of balloons are displayed at the same timing. Furthermore, the operation accepting unit 111 may give a guidance instruction in another form. For example, when it is decided to applaud at a specific timing during the performance of the cheering song, the operation accepting unit 111 may guide the operation timing of the viewer operation to output audio of applause. Note that instead of the guidance image GI8, the watching user may be required to set a team to cheer on in advance, and an operation button including a character string of "Balloon" which does not include a color may be displayed. In this case, when the watching user touches the operation button, a balloon of a color corresponding to the set team to be cheered on may be displayed. As a result, it is possible to prevent operation mistakes by the watching user, and it is possible to prevent the watching user from cheering for the opponent team due to a mistaken operation.

Furthermore, the operation accepting unit 111 may accept a main operation on the condition of consumption of compensation as the viewer operation. In the example of FIG. 8, the operation of selecting the guidance image GI3 in order to output the cheering song is the main operation. Then, when the operation accepting unit 111 accepts the main operation, the subordinate operation is accepted as the viewer operation. In the example of FIG. 8, the operation of selecting the guidance image GI8 to display the image of flying a balloon is a subordinate operation. Then, the operation accepting unit 111 guides the operation timing of the subordinate operation during the period in which the operation effect corresponding to the main operation is executed. In the example of FIG. 8, the operation accepting unit 111 displays the guidance image GI7 that guides the operation timing of the subordinate operation during the period in which the audio of the cheering song is outputted as the operation effect corresponding to the main operation. Note that in this case, the audio of the cheering song is not automatically outputted, but is outputted on the condition that the main operation is accepted.

Note that the watching user may set the operation timing of the subordinate operation. For example, the watching user who performed the main operation inputs specific information (for example, the elapsed time from the start of the cheering song) indicating the operation timing of the subordinate operation via the reproduction terminal 20. The server control unit 11 inserts data for indicating the operation timing of the subordinate operation into the sequence data based on the inputted specific information. By referencing this sequence data, the operation accepting unit 111 gives a guidance instruction such that the determination line L2 reaches the guidance image GI7 at the timing inputted by the watching user who performed the main operation.

The evaluation unit 112 evaluates the mutual relationship of the inputs of the viewer operations by each of the plurality of watching users. Furthermore, the evaluation unit 112 evaluates the mutual relationship according to the number of viewer operations in a close relationship. In the example of FIG. 8, the evaluation unit 112 accumulates points corresponding to the number of viewer operations in a close relationship as the evaluation result. Then, the evaluation unit 112 displays the evaluation result on the reproduction terminal 20 together with the game video in an evaluation result field ER2. The evaluation unit 112 determines a high evaluation as the evaluation result when the cumulative evaluation result reaches a predetermined value.

The effect control unit 113 exhibits the operation effect based on the input timing of the viewer operation. Specifically, the effect control unit 113 causes the display unit 24 to display the operation effect corresponding to the viewer operation, or causes the speaker 25 to output audio. In the example of FIG. 8, the effect control unit 113 displays the effect image EI5 as the operation effect. Note that in the example of FIG. 8, the effect control unit 113 displays the effect image EI5 so as to represent a balloon flying. Simultaneously, the effect control unit 113 may cause the speaker 25 to output audio of a whistle as a performance sound when the balloon flies.

Furthermore, the effect control unit 113 changes the operation effect corresponding to the viewer operation when the evaluation result from the evaluation unit 112 satisfies a predetermined condition. In the example of FIG. 8, the evaluation unit 112 determines a high evaluation as the evaluation result when synchronization points, which are the cumulative evaluation result, reach a predetermined value. When a high evaluation is determined, the effect control unit 113 additionally outputs a particular performance as a changed operation effect. For example, the effect control unit 113 increases the number of displayed balloons.

As a result, when the input of the viewer operation by each of the plurality of watching users is strongly related, for example, when there are many viewer operations in a close relationship, the effect control unit 113 exhibits a predetermined operation effect or exhibits a greater operation effect. Therefore, the operation accepting unit 111 causes the display unit 24 to display a guidance image that guides the operation timing of the viewer operation. Thus, it is possible to guide a plurality of watching users to operate at close timings, and as a result, it is possible to strengthen the relevance of the input of the viewer operation by each of the plurality of watching users. Conversely, when the viewer operation of each watching user is evaluated by comparison with the guided operation timing, each watching user cannot match the input timing of the viewer operation with other watching users. Therefore, it becomes difficult to obtain a sense of solidarity with other watching users.

[Flow of Processing by Watching System]

The flow of processing by the watching system 100 in the third embodiment will be described with reference to FIG. 9. Note that in FIG. 9, illustration of the flow of some of the processing already described is omitted for convenience of description.

The watching system 100 starts processing when a predetermined start condition is satisfied. Then, the server control unit 11 of the management server 10 acquires the game video from the distributing server 30 (S301). Then, the screen generation unit 115 acquires data for displaying the operation guidance field OG2 from the operation accepting unit 111, and further acquires data for displaying the evaluation result field ER2 from the evaluation unit 112 to generate the watching screen (S302). Subsequently, the distributing unit 116 distributes the game video and the watching screen to the reproduction terminal 20 (S303). As a result, the reproduction terminal 20 causes the display unit 24 to display the game video and the watching screen.

When the timing for accepting the viewer operation approaches, the operation accepting unit 111 executes the operation accepting process (S304). In the example of FIG. 8, the operation accepting unit 111 causes the display unit 24 to display the guidance image GI7 that guides the operation timing of the viewer operation and moves the guidance image GI7 toward a bar. For example, the timing at which the guidance image GI7 reaches the bar is the timing at which the cheering song ends. Furthermore, the operation accepting unit 111 displays the guidance image GI8 in the input field IF. Moreover, the screen generation unit 115 generates a watching screen such that the guidance images GI7 and GI8 are displayed. Then, the distributing unit 116 distributes the generated watching screen. Note that when the operation accepting unit 111 accepts the main operation, the steps S204 to S209 shown in FIG. 7 are executed instead of the step S304.

In the operation accepting process, the operation accepting unit 111 acquires the input timing and the input position of the viewer operation when the watching user touches the operation button of the input field IF. Then, the evaluation unit 112 evaluates the mutual relationship of the inputs of the viewer operations by each of the plurality of watching users (S305). Also, the effect control unit 113 determines whether a predetermined condition is satisfied by referencing the evaluation result of the mutual relationship by the evaluation unit 112 (S306). When a predetermined condition is satisfied (YES in S306), the effect control unit 113 changes the operation effect (S307) and, for example, exhibits an emphasized operation effect. Conversely, when the predetermined condition is not satisfied (NO in S306), the effect control unit 113 exhibits a normal operation effect (S308). Afterward, when the distributing is terminated due to a reason such as the game video being played to the end (YES in S309), the watching system 100 ends the process. Conversely, when the distributing is continued (NO in S309), the watching system 100 repeats the processing.

According to the third embodiment described above, it is possible to give relevance to the effects exhibited in response to the operations by the plurality of watching users. That is, the operation accepting unit 111 causes the display unit 24 to display a guidance image that guides the operation timing of the viewer operation as a guidance instruction for the viewer operation. As a result, a plurality of watching users can cooperatively realize a cheering action composed of a plurality of operation effects by viewer operations having aligned timings. Therefore, the watching user can obtain a sense of solidarity with other watching users, and the watching user's desire to watch is improved. Furthermore, it is possible to provide the watching user with a simulated experience as when a plurality of watching users perform the cheering act as one. Moreover, it is possible to align the timing of exhibiting the operation effect corresponding to the viewer's operation as much as possible. Therefore, it is possible to avoid giving a complicated impression to the watching users who are watching the game video.

Note that in the third embodiment, the main operation may be executable without the condition of consumption of compensation. That is, the watching user may be able to execute the main operation without paying the compensation. Even in this case, it is possible to align the timing of exhibiting the operation effect corresponding to the viewer's operation as much as possible. Furthermore, the evaluation unit 112 need not evaluate the mutual relationship between the inputs of the viewer operations. Moreover, the effect control unit 113 may exhibit the same operation effect as the display mode of the effect image or the output mode of the effect audio regardless of the evaluation result by the evaluation unit 112.

Although the present invention has been described above with reference to each embodiment, the present invention is not limited to the foregoing embodiments. The present invention also includes inventions modified to the extent not contrary to the present invention and inventions equivalent to the present invention. Additionally, each embodiment and each modification can be appropriately combined insofar as it does not contradict the present invention.

For example, the evaluation unit 112 may evaluate the input timing of the viewer operation by each watching user. That is, the evaluation unit 112 may evaluate the viewer operation by each watching user based on the reference timing corresponding to the guidance instruction by the operation accepting unit 111. For example, the reference timing is an operation timing. In this case, the effect control unit 113 may control the operation effect such that the display mode of the effect image or the output mode of the effect audio changes based on the evaluation result by the evaluation unit 112. Furthermore, the effect control unit 113 may control the operation effect so as to affect the video distributed to each watching user or may control the operation effect so as to affect the video distributed to all watching users.

As one example, the operation accepting unit 111 acquires the input timing and the input position of the viewer operation from each watching user. Then, the evaluation unit 112 evaluates the viewer operation based on the comparison between the acquired input timing and input position and the operation timing and operation position guided by the guidance image. Then, when the evaluation unit 112 determines that the difference between the two is within a predetermined range, the evaluation unit 112 evaluates the viewer operation such that the evaluation result becomes higher. For example, the evaluation unit 112 adds points for each watching user. When the evaluation result by the evaluation unit 112 satisfies a predetermined condition, the effect control unit 113 exhibits an operation effect or changes the operation effect.

Furthermore, in the above description, the management server 10 combines the watching screen with the game video to be distributed. However, by executing a program downloaded to the reproduction terminal 20 in advance, the reproduction control unit 21 may display a fixed portion such as a frame of the watching screen. In this case, the management server 10 or the distributing server 30 may distribute a dynamic portion such as a cheering message of the watching user or an operation effect by the viewer operation. Furthermore, each of the game server 60, the distributing server 30, and the management server 10 may belong to different systems or may be operated by different managers. For example, the management server 10 may be configured to acquire a game video from the outside, combine a watching screen with the game video, and distribute the game video. In this case, the management server 10 may receive information on the progress status of the game from the game server 60 at any time or may receive a signal from the game server 60 notifying the accepting timing that enables the viewer operation to be accepted. Alternatively, an operator who monitors the progress status of the game may input information on the progress status of the game or a signal notifying the accepting timing.

Hereinafter, various aspects derived from the above-described embodiments and modifications will be described. Additionally, in order to facilitate understanding of each aspect, reference numerals shown in the accompanying drawings are added. However, the reference numerals are not added with the intention of limiting the present invention to the illustrated aspect.

A watching system (100) by which a game video is distributed to display devices (24) of a plurality of watching users, the watching system comprises: operation accepting means (111) accepting viewer operations by the plurality of watching users; evaluation means (112) evaluating a mutual relationship of input of the viewer operation by each of the plurality of watching users; and effect control means (113) controlling an operation effect corresponding to the viewer operation so as to change based on evaluation result of the mutual relationship.

Furthermore, a computer program (PG) for a watching system (100) by which a game video is distributed to display devices (24) of a plurality of watching users and which has a computer (11), the computer program causes the computer to function as: operation accepting means (111) accepting viewer operations by the plurality of watching users; evaluation means (112) evaluating a mutual relationship of input of the viewer operation by each of the plurality of watching users; and effect control means (113) controlling an operation effect corresponding to the viewer operation so as to change based on evaluation result of the mutual relationship.

Moreover, a control method of a watching system (100) by which a game video is distributed to display devices (24) of a plurality of watching users, the control method comprises: accepting viewer operations by the plurality of watching users, evaluating a mutual relationship of input of the viewer operation by each of the plurality of watching users, and controlling an operation effect corresponding to the viewer operation so as to change based on evaluation result of the mutual relationship.

The evaluation means (112) compares input timings of the viewer operations by the plurality of watching users to evaluate the mutual relationship, and the effect control means (113) changes the operation effect when the evaluation result by the evaluation means satisfies a predetermined condition.

Furthermore, the effect control means (113) controls the operation effect based on the evaluation result such that a display mode of an effect image or an output mode of an effect audio changes.

The operation accepting means (111) executes a guidance instruction for guiding at least one of an operation timing at which the viewer operation should be performed and an operation position where the viewer operation should be performed.

Furthermore, the evaluation means (112) compares the input timings of the viewer operations by the plurality of watching users based on a reference timing corresponding to the guidance instruction by the operation accepting means (111).

The watching system (100) further comprises compensation accepting means (114) accepting payment of compensation for the viewer operation.

Furthermore, when the compensation is paid for the viewer operation, the effect control means (113) controls the operation effect so as to change a display mode of an effect image or an output mode of an effect audio.

Moreover, the operation accepting means (111) accepts a main operation as the viewer operation on the condition that the compensation is consumed, and accepts a subordinate operation as the viewer operation when the main operation is accepted.

What is claimed is:

1. A watching system by which a game video is distributed to display devices of reproduction terminals for a plurality of watching users and which has a computer, the watching system comprising:
   the computer accepting viewer operations by the plurality of watching users, wherein each of the viewer operations is inputted by an operation device of each reproduction terminal;
   the computer causing each display device to display an effect image, a speaker of each reproduction terminal to output effect audio, or a vibration device of each reproduction terminal to vibrate;
   the computer evaluating a mutual relationship of input of the viewer operation by each of the plurality of watching users; and
   the computer changing a display mode of the effect image displayed on the display device, an output mode of the effect audio outputted from the speaker, or a vibration mode by the vibration when an evaluation result of the mutual relationship satisfies a predetermined condition.

2. The watching system according to claim 1, wherein the computer compares input timings of the viewer operations by the plurality of watching users to evaluate the mutual relationship,
   the computer determines a high evaluation result when a number of input timings in close proximity is higher than a predetermined reference value, and
   the predetermined condition is satisfied when the high evaluation result is obtained, when the high evaluation result continues for a predetermined time, when the high evaluation result is achieved a predetermined number of times.

3. The watching system according to claim 1, wherein the computer emphasizes the effect image, the effect audio, or the vibration.

4. The watching system according to claim 1, wherein the computer executes a guidance instruction for guiding at least one of an operation timing at which the viewer operation should be performed or an operation position where the viewer operation should be performed.

5. The watching system according to claim 4, wherein the computer compares the input timings of the viewer operations by the plurality of watching users based on a reference timing corresponding to the guidance instruction by the computer.

6. The watching system according to claim 1, further comprising the computer accepting payment of compensation for the viewer operation.

7. The watching system according to claim 6, wherein the predetermined condition is satisfied when the compensation is paid for the viewer operation.

8. The watching system according to claim 6, wherein the computer accepts a main operation as the viewer operation on a condition that the compensation is consumed, and
   accepts a subordinate operation as the viewer operation when the main operation is accepted.

9. The watching system according to claim 1, wherein the computer causes the display device to display the effect image, the speaker to output the effect audio, or the vibration device to vibrate corresponding to the viewer operation, and changes the display mode of the displayed effect image, the output mode of the effect audio to be outputted, or the vibration mode of the vibration which is being exhibited.

10. A non-transitory computer readable recording medium storing a computer program for a watching system by which a game video is distributed to display devices of reproduction terminals for a plurality of watching users and which has a computer, the computer program causing the computer:
    to accept viewer operations by the plurality of watching users wherein each of the viewer operations is inputted by an operation device of each reproduction terminal;
    to cause each display device to display an effect image, a speaker of each reproduction terminal to output effect audio, or a vibration device of each reproduction terminal to vibrate;
    to evaluate a mutual relationship of input of the viewer operation by each of the plurality of watching users; and
    to change a display mode of the effect image displayed on the display device, an output mode of the effect audio outputted from the speaker, or a vibration mode by the vibration device when an evaluation result of the mutual relationship satisfies a predetermined condition.

11. A control method of a watching system by which a game video is distributed to display devices of reproduction terminals for a plurality of watching users, the control method comprising:
    accepting viewer operations by the plurality of watching users, wherein each of the viewer operations is inputted by an operation device of each reproduction terminal;
    causing each display device to display an effect image, a speaker of each reproduction terminal to output effect audio, or a vibration device of each reproduction terminal to vibrate;
    evaluating a mutual relationship of input of the viewer operation by each of the plurality of watching users; and
    changing a display mode of the effect image displayed on the display device, an output mode of the effect audio outputted from the speaker, or a vibration mode by the vibration device when an evaluation result of the mutual relationship satisfies a predetermined condition.

* * * * *